US011128915B2

(12) United States Patent
Chen

(10) Patent No.: US 11,128,915 B2
(45) Date of Patent: Sep. 21, 2021

(54) FINGERPRINT LAYOUTS FOR CONTENT FINGERPRINTING

(71) Applicant: Roku, Inc., San Jose, CA (US)

(72) Inventor: Juikun Chen, West Jordan, UT (US)

(73) Assignee: ROKU, INC., San Jose, CA (US)

( * ) Notice: Subject to any disclaimer, the term of this patent is extended or adjusted under 35 U.S.C. 154(b) by 0 days.

(21) Appl. No.: 16/925,730

(22) Filed: Jul. 10, 2020

(65) Prior Publication Data

US 2020/0413132 A1    Dec. 31, 2020

Related U.S. Application Data

(63) Continuation of application No. 16/287,752, filed on Feb. 27, 2019, now Pat. No. 10,743,062, which is a (Continued)

(51) Int. Cl.
*H04N 21/4415* (2011.01)
*H04N 21/488* (2011.01)
(Continued)

(52) U.S. Cl.
CPC ... *H04N 21/4415* (2013.01); *H04N 21/23418* (2013.01); *H04N 21/2541* (2013.01);
(Continued)

(58) Field of Classification Search
None
See application file for complete search history.

(56) References Cited

U.S. PATENT DOCUMENTS 9,324,006 B2   4/2016  Vanhoucke et al.
9,380,325 B1   6/2016  Cormie et al.
(Continued)

FOREIGN PATENT DOCUMENTS

CN   101473657 A   7/2009
JP   2009-542081 A1   11/2009
(Continued)

OTHER PUBLICATIONS

International Search Report and Written Opinion dated May 19, 2017, issued in connection with International Application No. PCT/US2017/021690, filed on Mar. 9, 2017, 19 pages.

*Primary Examiner* — Alexander Q Huerta
(74) *Attorney, Agent, or Firm* — McDonnell Boehnen Hulbert & Berghoff LLP

(57) ABSTRACT

A method is disclosed for identifying the media content. The method includes receiving fingerprint media content from a content provider to obtain a first set of fingerprints, the first set of fingerprints including a first subset of fingerprints in a first fingerprint layout and a second subset of fingerprints in a second fingerprint layout. The method can include receiving a second set of fingerprints for media content displayed on the electronic device, the second set of fingerprints comprising a third subset of fingerprints in the first fingerprint layout and a fourth subset of fingerprints in the second fingerprint layout. The method can include matching a first fingerprint in the first subset of fingerprints to a second fingerprint in the third subset of fingerprints or a third fingerprint in the second subset of fingerprints to a fourth fingerprint in the fourth subset of fingerprints in order to identify the media content.

20 Claims, 14 Drawing Sheets

Related U.S. Application Data continuation of application No. 16/035,051, filed on Jul. 13, 2018, now Pat. No. 10,257,570, which is a continuation of application No. 15/243,658, filed on Aug. 22, 2016, now Pat. No. 10,063,917.

(60) Provisional application No. 62/309,366, filed on Mar. 16, 2016.

(51) Int. Cl.
    *H04N 21/431*      (2011.01)
    *H04N 21/254*      (2011.01)
    *H04N 21/234*      (2011.01)
    *H04N 21/2668*      (2011.01)
    *H04N 21/81*      (2011.01)
    *H04N 21/835*      (2011.01)

(52) U.S. Cl.
    CPC ..... *H04N 21/2668* (2013.01); *H04N 21/4312* (2013.01); *H04N 21/4882* (2013.01); *H04N 21/4884* (2013.01); *H04N 21/812* (2013.01); *H04N 21/814* (2013.01); *H04N 21/8146* (2013.01); *H04N 21/835* (2013.01)

(56) References Cited

U.S. PATENT DOCUMENTS

| | | | |
|---|---|---|---|
| 9,619,854 B1* | 4/2017 | Sharifi | H04N 21/4826 |
| 9,706,261 B2 | 7/2017 | Chen | |
| 10,063,917 B2* | 8/2018 | Chen | H04N 21/23418 |
| 10,257,570 B2* | 4/2019 | Chen | H04N 21/812 |
| 10,509,824 B1* | 12/2019 | Brimley | G06F 16/9535 |
| 10,743,062 B2* | 8/2020 | Chen | H04N 21/814 |
| 2005/0149968 A1 | 7/2005 | Konig et al. | |
| 2005/0172312 A1 | 8/2005 | Lienhart et al. | |
| 2006/0195860 A1* | 8/2006 | Eldering | G06F 16/785 725/19 |
| 2007/0253594 A1 | 11/2007 | Lu et al. | |
| 2009/0324199 A1* | 12/2009 | Haitsma | H04H 60/59 386/241 |
| 2010/0269128 A1 | 10/2010 | Gordon | |
| 2010/0303338 A1 | 12/2010 | Stojancic et al. | |
| 2011/0157471 A1 | 6/2011 | Seshadri et al. | |
| 2011/0289114 A1 | 11/2011 | Yu et al. | |
| 2012/0117584 A1* | 5/2012 | Gordon | H04N 21/44213 725/19 |
| 2012/0191231 A1 | 7/2012 | Wang | |
| 2013/0071090 A1 | 3/2013 | Berkowitz et al. | |
| 2013/0202150 A1 | 8/2013 | Sinha et al. | |
| 2013/0204889 A1 | 8/2013 | Sinha et al. | |
| 2013/0246457 A1 | 9/2013 | Stojancic et al. | |
| 2013/0326557 A1 | 12/2013 | Kang et al. | |
| 2013/0326573 A1 | 12/2013 | Sharon et al. | |
| 2014/0149395 A1 | 5/2014 | Nakamura et al. | |
| 2014/0201769 A1 | 7/2014 | Neumeier et al. | |
| 2014/0236988 A1* | 8/2014 | Harron | G06F 16/7335 707/769 |
| 2014/0282670 A1 | 9/2014 | Sinha et al. | |
| 2014/0282673 A1 | 9/2014 | Neumeier et al. | |
| 2016/0119688 A1 | 4/2016 | Yabu et al. | |
| 2016/0196631 A1 | 7/2016 | Master et al. | |
| 2016/0316261 A1* | 10/2016 | Koshevoy | H04H 60/59 |
| 2016/0316262 A1 | 10/2016 | Chen | |
| 2017/0118538 A1* | 4/2017 | Ashbacher | G06F 16/783 |
| 2017/0150213 A1* | 5/2017 | Cremer | H04N 21/4333 |
| 2017/0180795 A1 | 6/2017 | Cremer et al. | |
| 2017/0244999 A1 | 8/2017 | Chen | |
| 2017/0272814 A1 | 9/2017 | Chen | |

FOREIGN PATENT DOCUMENTS

| | | |
|---|---|---|
| WO | WO 2007/148264 A1 | 12/2007 |
| WO | WO 2014/080783 A1 | 1/2017 |
| WO | WO 2015/033500 A1 | 3/2017 |

\* cited by examiner

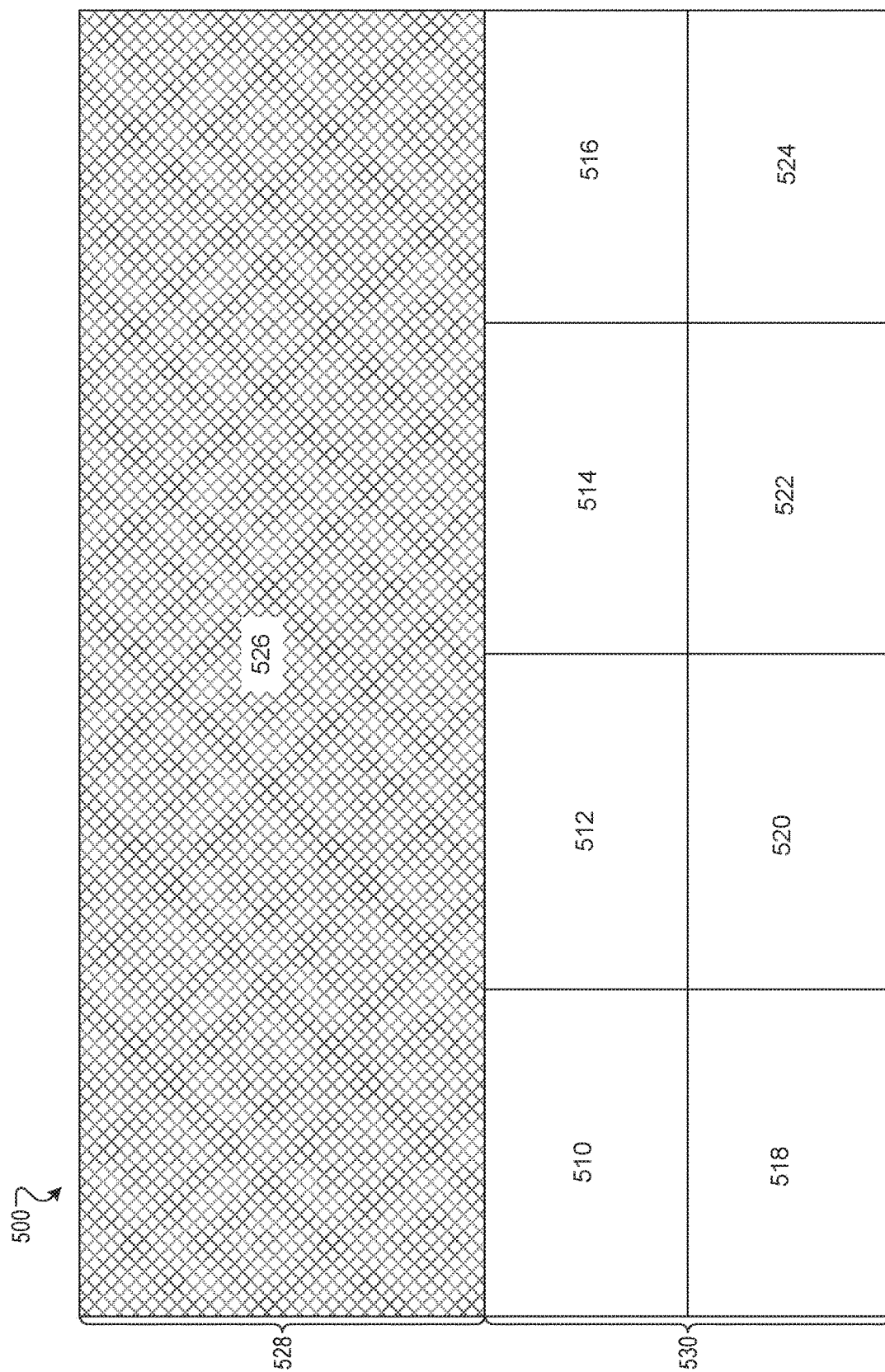

FINGERPRINT LAYOUTS FOR CONTENT FINGERPRINTING

CROSS REFERENCE TO RELATED APPLICATIONS

This U.S. patent application is a continuation of, and claims priority under 35 U.S.C. § 120 from, U.S. patent application Ser. No. 16/287,752, filed Feb. 27, 2019 which is a continuation of, and claims priority under 35 U.S.C. § 120 from, U.S. patent application Ser. No. 16/035,051, filed Jul. 13, 2018 which is a continuation of, and claims priority under 35 U.S.C. § 120 from, U.S. patent application Ser. No. 15/243,658, filed on Aug. 22, 2016, which claims priority under 35 U.S.C. § 119(e) to U.S. Provisional Application 62/309,366, filed on Mar. 16, 2016. The disclosures of these prior applications are considered part of the disclosure of this application and are hereby incorporated by reference in their entireties.

BACKGROUND

Media consumption devices, such as smart televisions (TVs), may access broadcast digital content and receive data, such as streaming media, from data networks. Streaming media refers to a service in which an end user may request media content, such as movies or news, over a telephone line, a cable channel, an Internet channel, and so forth. For example, a user may view a movie without having to leave their residence. In addition, users may access various types of educational content, such as video lectures, without having to attend a physically class at a school or an educational institution.

As the number of media consumption devices continues to increase, video content generation and delivery may similarly increase. With an increase in the use of media consumption devices that access the broadcast digital content and the streaming media, content providers or network providers may distribute contextually relevant material to viewers that are consuming the broadcast digital content or the streaming media. For example, local broadcasters may include contextually relevant advertisements and interactive content with the broadcast digital content or the streaming media.

DESCRIPTION OF DRAWINGS

FIG. 3B illustrates a compositing of the media content and the onscreen display that includes a window according to one embodiment.

FIG. 5C illustrates a bottom subdivided fingerprint layout of the frame as shown in FIG. 5A according to one embodiment.

Like reference symbols in the various drawings indicate like elements.

DETAILED DESCRIPTION

Figure 1:
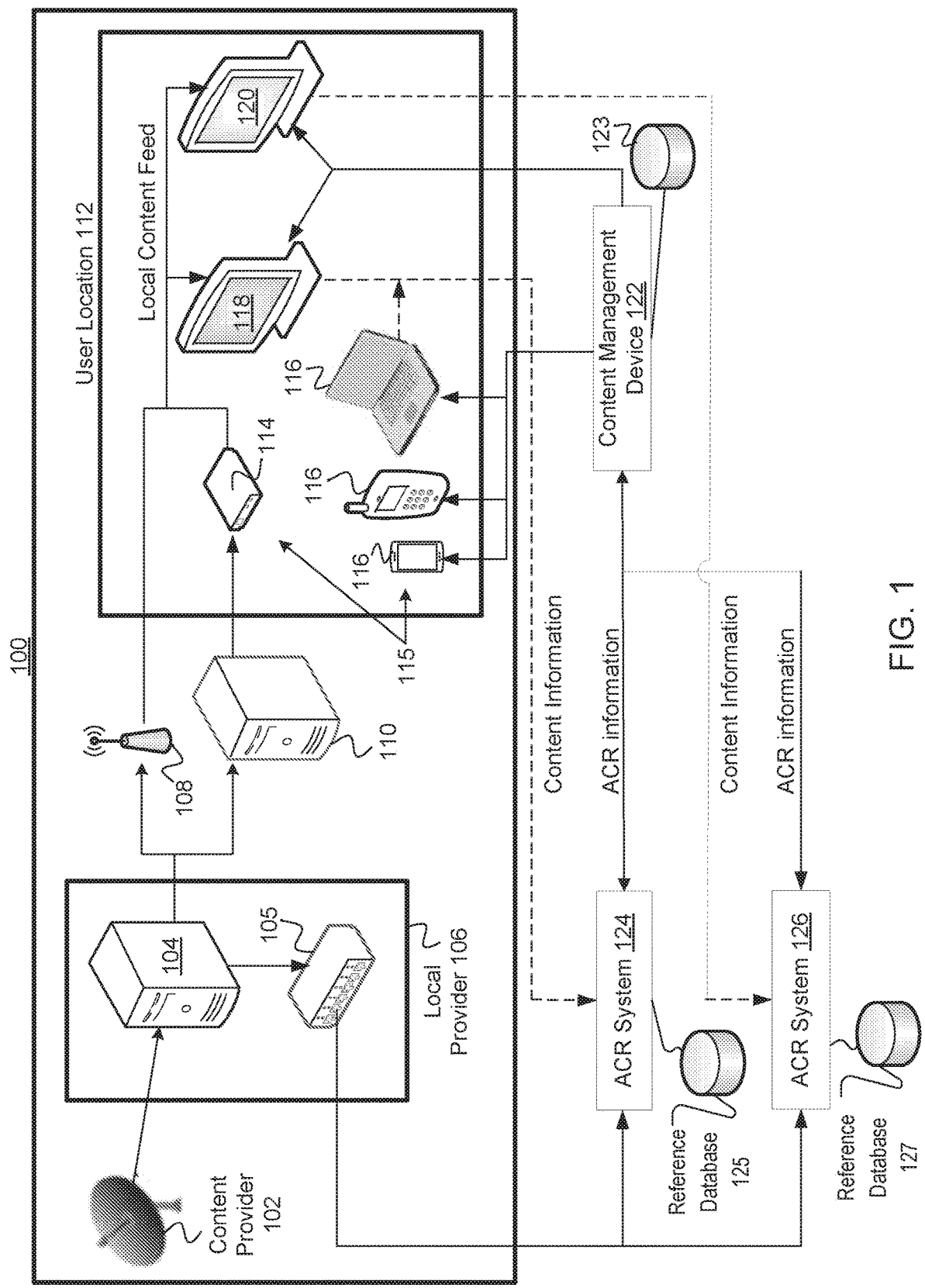
FIG. 1 illustrates a system diagram of a content distribution network according to one embodiment.

Currently, there are several hundred program choices offered by cable television (TV) providers and satellite providers. In addition, there are over one hundred major television market areas with dozens of local television channels. A content provider or broadcaster may generate content feeds at a central location and distribute the content feeds to a variety of locations. For example, a content provider may distribute a television channel to a number of network providers. The network providers can be local broadcasters, multi-channel networks, and other content owners or distributors.

The word "content" can refer to media or multimedia. The word "content" can also be a specific term that means the subject matter of the medium rather than the medium itself. Likewise, the word "media" and some compound words that include "media" (e.g. multimedia or hypermedia) are instead referring to content, rather than to the channel through which the information is delivered to the end user/audience. An example of a type of content commonly referred to as a type of media is a "motion picture," referred to as "a film." Another example is a "video," which typically includes video frames and audio samples. A "broadcasting" can refer to transmitting information (such as media content) by a radio, a television, or other electronic device. In one example, an electronic device can broadcast media content using a transmitter. In another example, the electronic device can stream the media content over the Internet or other private or public networks. A "broadcast" can also refer to media content, such as video and audio content, that is delivered to a dispersed audience using a content delivery system, such as over the air (OTA), cable, satellite, or an Internet-based network, in a one-to-many model. For example, a broadcast may be the media content that is received at an electronic device from a radio or television transmitter.

Media content broadcasting or streaming, such as TV show or internet broadcast, may be an engaging venue to advertise products and services, provide information to viewers, or any combination thereof. To create revenue to provide numerous programming choices, content providers (such as television networks) can insert advertisements (ADs) into media content. Conventionally, advertisers have relied on sending one stream of media content to all the viewers of a channel, with the local broadcasters only targeting viewers based on an audience analysis and ratings providers, such as ratings provided by The Nielsen Company®.

While TV advertising is an engaging venue to advertise products or services, traditional TV advertising lacks ADs that are targeted and personalized for different viewers. Automatic content recognition (ACR) systems can use fingerprinting to identify media content and provide viewers with targeted and/or personalized advertising. For example, an ACR system can identify media content using content fingerprinting. In one embodiment, the ACR system can be software executing on an electronic device, such as a server or TV. In another embodiment, the ACR system can be a service, hosted by a vendor or service provider, that is accessible by an electronic device over the Internet. For example, the ACR system can be a Software as a Service (SaaS), Platform as a Service (PaaS), or an Infrastructure as a Service (IaaS).

Content fingerprinting can include a processing device that identifies, extracts, and compresses fingerprint components of a media content to uniquely identify the media content by its "fingerprint." In one example, fingerprint components can be visual video features, such as key frame analysis, colors, and motion changes during a video sequence. The ACR system can identify the video content by matching one content fingerprint or a sequence of content fingerprints from the media content being displayed by the electronic device with fingerprints stored in a reference database.

However, when the electronic device overlays an onscreen display on to the media content, the onscreen display can interfere with the ACR system identifying the media content. For example, the electronic device can overlay the onscreen display onto the media content it receives from a content provider. The onscreen display can be a logo, closed caption text, an emergency message, a volume bar, a channel number, a configuration menu, and so forth.

Conventionally, when the electronic device generates a content fingerprint and sends it to the ACR system, the content fingerprint of the media content may include the onscreen display, which may interfere with the ACR system matching the content fingerprint with a stored fingerprint of the media content because the stored fingerprint does not include the onscreen display. When the content fingerprint includes the onscreen display and the store fingerprint does not, at least part of the stored fingerprint is different than the content fingerprint.

Described herein are methods, systems, and devices for enabling an ACR system to identify media content that includes onscreen display overlayed on, or embedded within, the media content. In one embodiment, a device can generate fingerprints using different frame formats. The device can be communicatively coupled to the electronic device, and the device can communicate the fingerprints to the ACR system. The ACR system can compare the fingerprints to other fingerprints to identify the media content being displayed The ACR system can use the different frame format to avoid the interference from the onscreen display in the media content. Using different frame formats for the fingerprints, as described in the embodiments herein, can avoid false positives when matching fingerprints. Using the different frame formats can also avoid missing actual matches when matching fingerprints.

FIG. 1 illustrates a system diagram of a content distribution network 100 according to one embodiment. In the content distribution network 100, a content provider 102 may broadcast a content feed to a local provider 106. The local provider 106 may include a headend 104 and an ACR fingerprinter server 105. The headend 104 of the local provider 106 can receive a content feed from the content provider 102. The headend 104 may generate a local content feed based on the received content feed. For example, the headend 104 may be a local affiliate broadcaster receiving a network channel with programming and advertisements from a national or global broadcaster. In one example, the headend 104 can be a source of a broadcast feed prior to the broadcast facility transmitting the broadcast feed. In another example, the headend 104 can be a distribution amplifier. The distribution amplifier can receive a source feed and it can create multiple outputs for different devices from the same source feed. The output feeds can be routed to various distribution outlets, such as for broadcast over the air (OTA), delivery to cable providers, delivery to satellite providers, and/or delivery to online streaming providers.

The headend 104 may communicate the local content feed to the ACR fingerprinter server 105, an over-the-air (OTA) broadcaster 108, and/or a multichannel video programming distributor (MVPD) 110. In one example, the ACR fingerprinter server 105 can be a device that is installed in a broadcast facility. The ACR fingerprinter server 105 can receive a feed from the headend 104. The ACR fingerprinter server 105 can fingerprint the feed and send the fingerprints to a cloud-based web service. In one embodiment, the ACR fingerprinter server 105 may be installed inside the broadcast facility in order to fingerprint a feed in advance of that feed being delivered to a display device, such as a television (TV).

The OTA broadcaster 108 and/or the MVPD 110 may communicate the local content feed to electronic devices 115. Some examples of the electronic devices 115 include electronic devices 118 and 120, a set top box 114 that streams media content to the electronic devices 118 and 120, as well as other devices 116 through which the user may stream the local content feed, e.g., wirelessly. In one example, the electronic devices 115 can include displays (such as liquid crystal displays or touchscreen displays) to display information.

In one example, the OTA broadcaster 108 may broadcast the local content feed using traditional local television channels or radio channels. In this example, the electronic devices 118 and 120 may include antennas (such as TV antennas or radio antennas) to receive the local content feed. In another example, the MVPD 110 (such as a cable broadcaster or a satellite broadcaster) may communicate the local content feed to a set top box 114. In this example, the set top box 114 may format the content feed for the electronic devices 118 and 120 and may communicate the formatted content feed to the electronic devices 118 and 120. The electronic devices 118 and 120 may include a display device, such as a television screen or a touch screen, to display the local content to a viewer.

Various components of the content distribution network 100 may be integrated or coupled to the electronic devices 118 and 120. For example, the electronic devices 118 and 120 can be smart televisions. In one example, the smart TV can include the antennas, the set top box 114 or an integrated ACR system, and the display device in a single unit. In another example, the smart TV can include a processing device and radio frequency (RF) circuitry. The processing device can execute an operating system (OS) and/or one or more applications, such as applications to access video-on-demand (VOD) content. The processing device can use an antenna of the radio frequency (RF) circuitry to communicate on a wireless local area network (WLAN). In one example, the processing device can use the RF circuitry to connect to the internet to access online interactive media or on-demand streaming media.

The ACR fingerprint server 105 may analyze the local content feed and determine fingerprint information (e.g., fingerprints). The ACR fingerprint server 105 may communicate the fingerprints to the ACR system 124 or 126. The ACR systems 124 and 126 may be different ACR systems selected by device manufacturers, such as smart TV manufacturers. In one example, the ACR system 124 or 126 can include processing logic or a processing device to execute instructions or perform processes. In another example, the ACR systems 124 and 126 can be ACR web services for different ACR vendors.

The ACR fingerprinter server 105 can enable the use of indexing clients from multiple ACR vendors. For example, different consumer electronics manufacturers (CEMs), such as TV manufactures, can independently select ACR vendors for integration into their electronic devices. To enable ACR-based functionality on a specific CEM's device, an ACR system can index broadcast feeds using ACR vendors CEMs have selected and integrated on that CEM's televisions. One advantage of integrating multiple ACR vendors onto the ACR fingerprinter server 105 can be to enable entities such as advertisers, advertising agencies, and content providers to interface with a single platform and deliver advanced advertising and content experiences to electronic devices from multiple CEMs.

In one example, the ACR system 124 can be coupled to a reference database 125. In another example, the ACR system 126 can be coupled to a reference database 127. The reference databases 125 and 127 can store fingerprints and media content. The content management device 122 can be a server component that receives messages from the ACR system 124 and/or 126. The messages can include information indicating what media content the electronic device 118 or 120 is going to display or is currently displaying. In one example, in response to the content management device 122 receiving the message, the content management device 122 can record an impression or association between the electronic device 118 or 120 and the media content stored in the database 123. In another example, in response to the content management device 122 receiving the message, the content management device 122 can generate and submit a query of the database 123 for available overlay content to superimpose on top of the media content.

In one embodiment, the ACR system 124 or 126 can send a fingerprint request to the electronic device 118 or 120, respectively, where the fingerprint request includes a frame format for the fingerprint. The electronic device 118 or 120 or an ACR system integrated into the electronic device 118 or 120 can generate a fingerprint in the frame format and send the fingerprint back to the ACR system 124 or 126. The ACR system 124 or 126 can use the fingerprint for media content identification.

The frame format can include a frame subdivided into multiple segments, as discussed in greater detail in the proceeding paragraphs. In one example, the frame format can exclude one or more segments of the multiple segments from being used by the ACR system 124 or 126 to match a content fingerprint to a stored fingerprint. For example, the one or more excluded segments can include a logo, closed caption text, an emergency message, and so forth. In another embodiment, the electronic device 118 or 120 can send a full fingerprint to the ACR system 124 or 126. The ACR system 124 or 126 can reformat the fingerprint to exclude one or more segments of the fingerprint as defined by the frame format. In one example, the ACR system 124 or 126 can request a variety of different fingerprint layouts. In another example, the ACR system 124 or 126 can reformat the fingerprints into a variety of different formats to use for content recognition.

To find a match between the content fingerprint from the electronic device 115 and the stored fingerprint in the reference database, the ACR system 124 or 126 can perform a one-to-one comparison between the content fingerprints and the stored fingerprints. For example, the ACR system 124 or 126 can use an O(n) algorithm (e.g., a linear algorithm) for the comparison, where n is the number of elements in the reference database. When the ACR system uses the O(n) algorithm to search the entries in the database, the ACR system may have to search through all or a relatively large number of the stored fingerprints in the reference database to find a match.

The content management device 122 filters the overlay content using the device information for the electronic device 118 or 120. The content management device 122 can send an overlay content, via the ACR system 124 or 126, to the electronic device 118 or 120. In one embodiment, the electronic device 118 or 120 can display the overlay content to a viewer. In another embodiment, the electronic device 118 or 120 can replace the media content with the overlay content and display the overlay content to a viewer.

In one embodiment, the ACR system 124 or 126 can cause triggers to be displayed on the electronic device 118 or 120. The electronic device 118 or 120 can recognize the triggers and send a request to the content management device 122 to record an impression or association between the electronic device 118 or 120 and the media content in the database 123. For example, the electronic device 118 or 120 can send a request to the content management device 122 to record whether a viewer changes a channel when the electronic device 118 or 120 displays select media content.

The automatic content recognition may be performed in a distributed architecture as described herein. In one embodiment, an ACR system can reside on any of the electronic device 115, 118, or 120. In one embodiment, the ACR system can perform automatic content recognition. In another embodiment, a local ACR system or a local ACR fingerprint matcher integrated into the electronic device 115, 118, or 120 to perform the automatic content recognition. In another embodiment, the ACR system may perform ACR fingerprint matching as described herein. In another embodiment, the ACR system can be a client-side matching component.

The electronic devices 115, 118, or 120 can be a media device, such as a television, mobile phone, or dongle. The ACR system can be software or firmware that executes or runs on the electronic devices 115, 118, or 120. The ACR system can fingerprint media content (such as audio content, video content, closed captions, emergency messages, and so forth) during a playback of the media content. The ACR system can communicate with ACR system 124 or 126 to facilitate identification of content and trigger events to cause the content overlay system to perform dynamic ad replacement and/or superimposing overlay content on top of the media content. The proceeding paragraphs describe the interactions of the ACR system with the ACR fingerprint server 105 in greater detail.

The ACR fingerprint server 105 may analyze the local content feed that may include an ordered sequence of frames from the local content feed and capture fingerprints. The ACR fingerprint server 105 may communicate the fingerprints to the ACR system 124 or 126. The ACR systems 124 and 126 may be different ACR systems selected by device manufacturers, such as smart TV manufacturers. In one example, the ACR fingerprint server 105 may format fingerprints for the different ACR systems 124 and 126.

The ACR systems 124 and 126 may establish communication connections with the different electronic devices 115. The electronic devices 115 may communicate fingerprint information to the ACR systems 124 and 126, respectively. When the ACR system 124 or 126 receives ACR fingerprint information from the electronic devices 115, the ACR system 124 or 126 may match the received fingerprints with those generated by the ACR fingerprint server 105. When a match occurs and the ACR system 124 or 126 identifies content, the ACR system 124 or 126 may communicate ACR events to a content management device 122.

In another example, the ACR system 124 or 126 may receive ACR fingerprint information from one of the electronic devices 115 and may match the received fingerprints with those generated by the ACR fingerprint server 105. When a match occurs and the ACR system 124 or 126 identifies content, the ACR system 124 or 126 may notify the electronic device 115 of the ACR events. The electronic device 115 may communicate ACR event information to the content management device 122.

Alternatively, or additionally, the ACR system 124 or 126 may directly communicate the ACR event information to the content management device 122. The ACR event information may include: information indicating the advertisements in the local content feed; information indicating selected or flagged content in the local content feed; or information indicating a change of a content channel at the electronic device 115 to new media content.

The ACR event information from the different ACR systems 124 and 126 may be in different formats and the content management device 122 may normalize the data into a common format. The content management device 122 can store the normalized data into a database 123. For example, the content management device 122 may receive disparate data sets from the ACR systems 124 and 126, the disparate data sets including similar but not identical data, such as data with the same content but formatted differently. The content management device 122 can process and reformat the disparate data sets to create a single data model or format (e.g., reformatted data sets). The content management device 122 can store the reformatted data sets in the database 123.

In one embodiment, to normalize disparate data sets from ACR systems 124 and 126, the content management device 122 may remove or filter data in the data sets. For example, some data sets may include fields or data that may be irrelevant to the content management device 122. In this example, the content management device 122 may remove or filter the irrelevant data. In another embodiment, to normalize the disparate data sets from the ACR systems 124 and 126, the content management device 122 may map fields in the data sets. For example, when the content management device 122 receives a first data set from the ACR system 124 and a second data set from the ACR system 126, at least some of the data fields of the first data set and the second data set may be common to both the first data set and second data set. However, the common data fields may be located at different places in the first data set and second data set. In this example, the content management device 122 may map the different data fields of the first data set and the second data set to normalized fields. When the content management device 122 maps the data fields, the same data fields are mapped to the same data field locations in the database 123.

In another embodiment, to normalize disparate data sets from the ACR systems 124 and 126, the content management device 122 may derive data from the data sets. For example, data from the ACR systems 124 and 126 may not include all of the fields that are needed to fill the data fields in the database. However, the content management device 122 may use other fields in the data sets from the ACR systems 124 and 126 to derive data for these data fields.

In one example, the database 123 may include data fields for a state in a country field, a designated market area (DMA) field, and a county and/or city field, but the data sets from the ACR systems 124 and 126 may only include zone improvement plan (ZIP) codes. In this example, the content management device 122 may use the ZIP codes to derive data for the fields in the database. In another example, the data set may not include any geographic location information, but may include an internet protocol (IP) address of the ACR systems 124 and 126. In this example, the content management device 122 may use a geo-IP lookup service to derive the state, DMA, county, city and ZIP code information.

In another example, the database 123 may include demographic fields such as an age field, a gender field, a household income field, and so forth. However, the data sets from the ACR systems 124 and 126 may not include the demographic fields or demographic data. In this example, the ACR systems 124 and 126 may provide the content management device 122 with the IP address of the electronic devices 115. The content management device 122 may use the IP addresses to determine the demographic data to populate the data fields in the database.

In another example, a field in a first data set from the ACR system 124 may include local time zone information, such as a mountain daylight time (MDT) zone, and a second data set from the ACR system 126 may include information from another time zone, such as a coordinated universal time (UTC) zone. The database may store all data using the UTC and the content management device 122 may convert the local time to UTC before storing the data in the database 123.

In one embodiment, the content management device 122 may use the normalized data to generate reports or data about user's viewing behavior (viewing data) across different ACR technology vendors and smart TVs or other Internet-connected video devices. The content management device 122 and the electronic devices 115 may include communication interfaces to communicate information, such as overlay content, between the electronic devices 115 and the content management device 122. In one example, the communication interface may communicate the information using a cellular network and/or a wireless network. In one example, the communication network may be a cellular network employing a third generation partnership project (3GPP) release 8, 9, 10, 11, or 12 or Institute of Electronics and Electrical Engineers, Inc. (IEEE®) 802.16p, 802.16n, 802.16m-2011, 802.16h-2010, 802.16j-2009, 802.16-2009. In another embodiment, the communication network may be a wireless network (such as a network using Wi-Fi® technology developed by the Wi-Fi Alliance) that may follow an IEEE® standard developed by the Institute of Electrical and Electronics Engineers, Inc., such as the IEEE 802.11-2012, IEEE 802.11ac, or IEEE 802.11ad standards. In another embodiment, the communication network may deploy Bluetooth® connections developed by the Bluetooth Special Interest Group (SIG) such as Bluetooth v1.0, Bluetooth v2.0, Bluetooth v3.0, or Bluetooth v4.0. In another embodiment, the communication network may be a Zigbee® connection developed by the ZigBee Alliance such as IEEE 802.15.4-2003 (Zigbee 2003), IEEE 802.15.4-2006 (Zigbee 2006), IEEE 802.15.4-2007 (Zigbee Pro).

In one example, the content management device 122 may instruct the electronic devices 115 to replace segments of the local content feed received from the OTA broadcaster 108 or the MVPD 110 with overlay content. In another example, the content management device 122 may instruct the electronic devices 115 to overlay or superimpose overlay content onto segments of the local content feed. The content management device 122 may aggregate ACR event information across multiple ACR systems 124 and 126 and may communicate overlay content to different electronic devices 115 (such as electronic devices from different device manufacturers).

The content management device 122 may also establish communication connections with other devices 116. In one example, the other devices 116 may communicate with the electronic devices 118 and 120 and provide an additional screen (e.g., a second screen) to display overlay content. For example, the electronic devices 118 and 120 may receive the local content feed from the OTA broadcaster 108 or the MVPD 110 and display the local content feed to a viewer. The other devices 116 may also communicate ACR event information to the ACR systems 124 and 126 when an ACR event occurs, as discussed in the preceding paragraphs. When the content management device 122 receives the ACR event information, the content management device 122 may communicate overlay content to the other devices 116.

In one example, the electronic devices 118 and 120 may continue to display the local content feed while the other devices 116 display the overlay content. In another example, the electronic devices 118 and 120 and the other devices 116 may both display the overlay content. In another example, the electronic devices 118 and 120 and the other devices 116 may display a segment of the overlay content and a segment of the local content feed. In another example, the electronic devices 118 and 120 and the other devices 116 may display different local content feeds and different overlay content.

In one example, the electronic devices 118 and 120 and/or the other devices 116 may display the overlay content at the time the electronic devices 118 and 120 and/or the other devices 116 receive the overlay content. In another example, the electronic devices 118 and 120 and/or the other devices 116 may delay displaying the overlay content for a threshold period of time. In one embodiment, the threshold period of time may be a predefined period of time. In another embodiment, the content management device 122 may select a period of time for the electronic devices 118 and 120 and the other devices 116 to delay displaying the overlay content.

Figure 2:
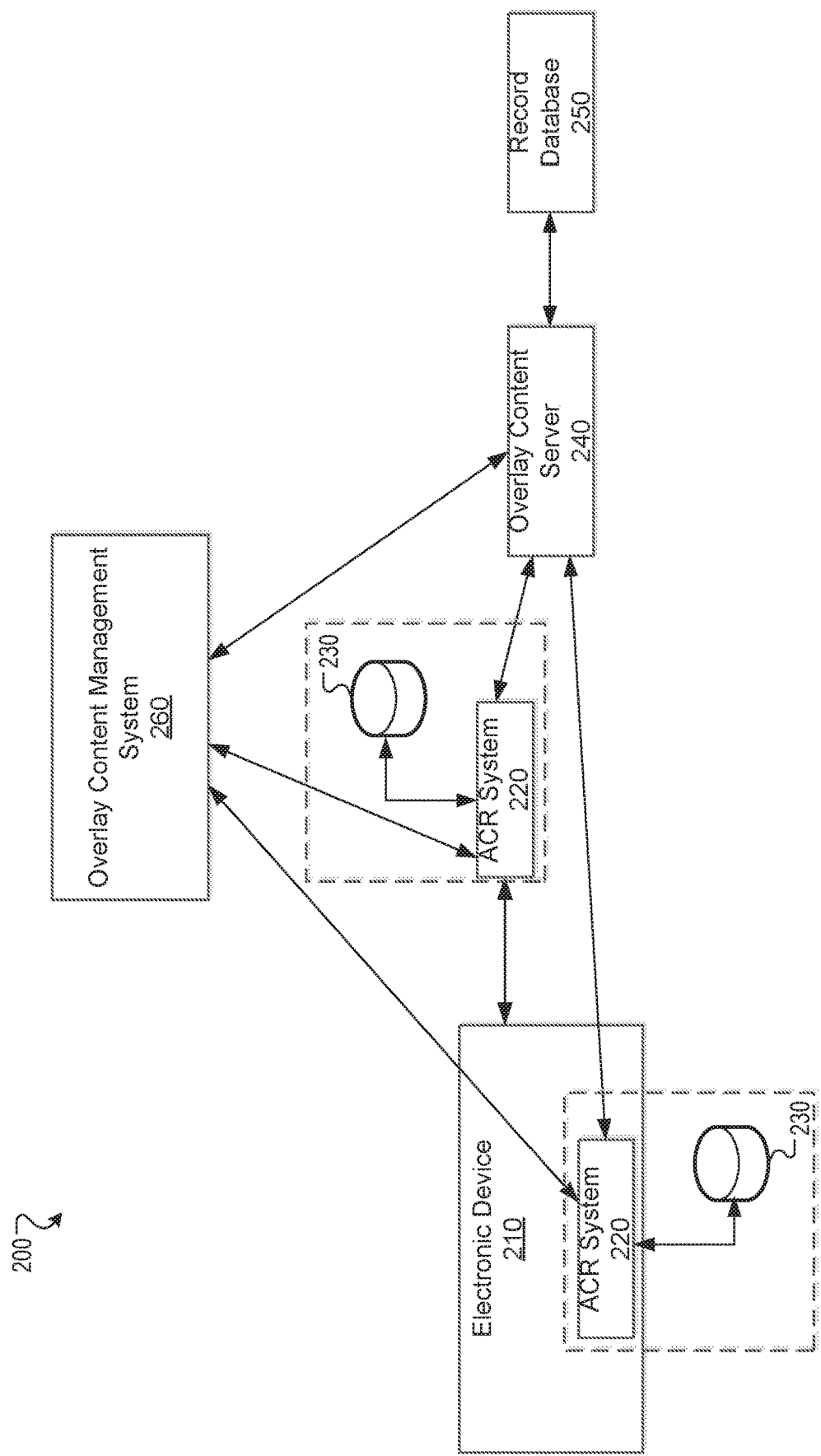
FIG. 2 illustrates a system diagram of a content overlay network according to one embodiment.

FIG. 2 illustrates a system diagram of a content overlay network 200 according to one embodiment. The content overlay network 200 can include an electronic device 210, a first ACR system 220, a content database 230, an overlay content server 240, a record database 250, and an overlay content management system 260. The ACR system 220 provides broadcast digital content to the electronic device 210. The broadcast digital content can include overlay content the ACR system 220 superimposes or overlays on top of media segments for the electronic device 210 to display to a viewer. A media segment can be a segment or portion of the media content. For example, the media segment can be a segment or portion of the media content for a TV program or a movie, such as a TV show clip or movie clip. In another example, the media segment of the media content can be a commercial that is part of the media content for the TV show or the movie.

In one embodiment, the ACR system 220 is integrated into the electronic device 210. In another embodiment, the ACR system 220 is coupled to the electronic device 210. In one example, the ACR system 220 can be directly coupled to the electronic device 210 using an input port of the electronic device 210. For example, the ACR system 220 is a High-Definition Media Interface (HDMI) dongle that plugs into an HDMI input terminal of the electronic device 210. In this example, the ACR system 220 can include an HDMI input port, an HDMI output port, and a network interface to receive broadcast content or media segments from a content provider. In another example, the ACR system 220 can be indirectly coupled to the electronic device 210 via another device that is coupled to the electronic device 210, such as an audio and/or video (A/V) device.

The electronic device 210 can use the ACR system 220 to display targeted or personalized overlay content segment to viewers. The overlay content segment can be an audio segment, a video segment, and/or a graphical segment of content. In one example, the overlay content segment can be a media object or file that includes an audio segment or a video segment of content that is a replacement AD. In another example, overlay content segment is an audio segment or video segment of a larger audio object or a larger video object that includes other overlay content segments.

In one embodiment, the ACR system 220 can use digital watermarking to ACR broadcast content. For digital watermarking, a content provider or a broadcaster can process the broadcast content to insert watermark data within a content signal prior to broadcast the content signal. The electronic device 210 or the ACR system 220 can detect the watermark data to identify and synchronize media segments with the broadcast content.

In another embodiment, the ACR system 220 can identify media content of the broadcast content, using content fingerprinting, as the electronic device displays the media content. The content fingerprinting can include the ACR system 220 matching a sequence of content fingerprints for media content the electronic device 210 is displaying with of stored fingerprints in a reference database. An advantage of content fingerprinting can be to process the media segment while the media segment is being broadcasted (e.g. live processing) or within a threshold period of time, such as several seconds, after the media segment is broadcast (e.g. substantially live processing). The content overlay network 200 can adjust overlay content segments, as the electronic device 210 displays the content, based on viewer behavior during a content broadcast (e.g. live or substantially live adjustments). In one example, the viewer behavior can include the electronic device 210 receiving a command from a user device to change a channel or to pause a display of media content. In another example, the viewer behavior can include the electronic device 210 receiving a command from the user device to display time-shifted content. As the viewers select or change the content, the content overlay network 200 can switch what overlay content is superimposed onto the media content.

The overlay content server 240 is coupled to the ACR system 220. The overlay content server 240 can receive overlay content from a content provider or advertiser. The overlay content server 240 can store media segments, overlay content segments, and format information for the media segments and overlay content segments. The overlay content server 240 can send media segments to the electronic device 210 in a select overlay format of the overlay formats.

The record database 250 is coupled to the overlay content server 240. The record database 250 can maintain a record of the media segments or overlay content segments that the electronic device 210 displays. In one embodiment, the electronic device 210 has a unique identifier (UID) associated with it that uniquely identifies the electronic device 210. The UID can also be associated with media segments or overlay content segments to indicate what media segments or overlay content segments the electronic device 210 has displayed.

In another embodiment, the record database 250 can receive a message from the overlay content server 240. In one example, the message can include a media segment ID that identifies a media segment and a UID that is associated with the media segment ID. In another example, the message can include an overlay content segment ID that identifies an overlay content segment and a UID that is associated with the overlay content segment ID. The record database 250 can store various media segment IDs and overlay content segment IDs with their associated UIDs for subsequent lookups by the overlay content server 240. The overlay content server 240 can search the record database 250 to determine when a media segment or overlay content segment associated with a respective media segment ID or overlay content segment ID has previously been displayed on the electronic device 210 with the UID.

In one embodiment, the overlay content management system 260 can include an input device to receive configuration information for a sequence of media segments and overlay content segments. In one example, the input device can be a software interface (such a web portal) on an electronic device, where a user can input configure information to configure the sequence of media segments and overlay content segments at the overlay content server 240. For example, the overlay content management system 260 can be an end-user accessible website for creating, viewing, updating, and deleting overlay content and replacement videos.

In one example, the user can use the input device to set rules or criteria for the overlay content server 240 to use to select an overlay content segment of an overlay content set. In one embodiment, the rules or criteria can include a sequence for displaying of items in an overlay content set, such as media content and overlay content segments. In another embodiment, the rules or criteria can include displaying different overlay content segments in view of demographic information of a user. In one example, when the user is a male, the electronic device 210 may display selected overlay content segments. In another example, when the user is a female, other overlay content segments may be displayed. In another embodiment, the rules or criteria can include displaying different overlay content segments in view of a time of day. For example, in the morning the electronic device 210 can display overlay content segments related to breakfast, in the evening the electronic device 210 can display overlay content segments related to dinner, and in the night time the electronic device 210 can display overlay content segments related to adult themes. In another embodiment, the overlay content server 240 can include an input device to receive configuration information to order media content and overlay content segments in a linear sequence. For example, a user can use a graphical user interface (GUI) to send configuration information to the overlay content server 240 to order the sequence of the media segments and overlay content segments.

Figure 3A:
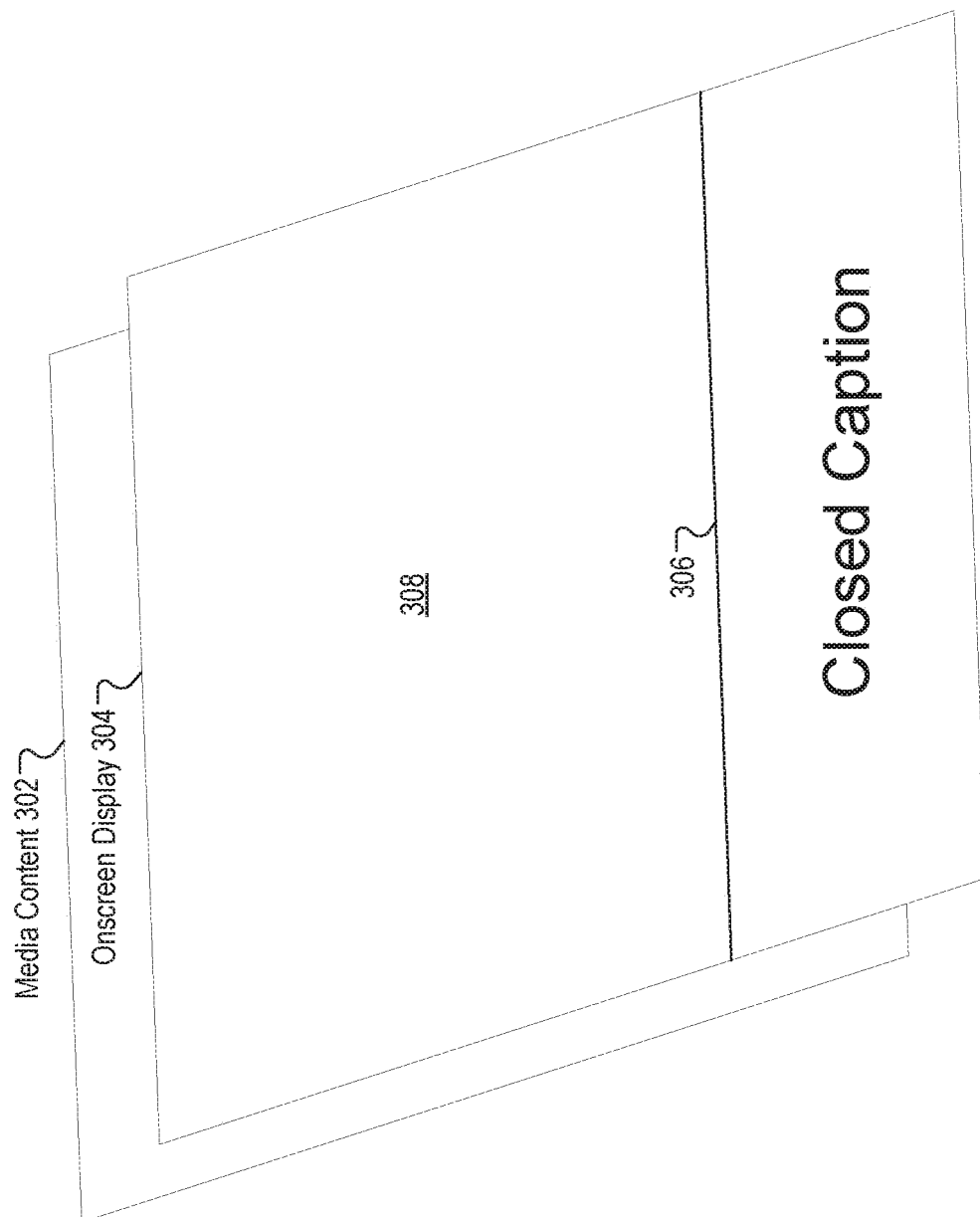
FIG. 3A illustrates a compositing of a frame to include media content and an onscreen display to create an image to display on an electronic device according to one embodiment.

FIG. 3A illustrates a compositing of a frame to include media content 302 and an onscreen display 304 to create an image to display on an electronic device according to one embodiment. Compositing can be a technique of creating a display image by stacking two or more videos or graphics on multiple tracks, such as the media content 302 and the onscreen display 304. A processing device, such as a processing device integrated into a smart TV or an ACR system, can blend the videos or graphics together into one image. In one embodiment, each track can be a layer. In one example, the highest layer or top layer, such as the onscreen display 304, can be the dominant layer. The dominant layer can be a layer that may be displayed in front of the media content 302. In one example, the onscreen display 304 can cover up at least a portion of the media content 302 (e.g., a lowest layer or bottom layer).

The layers of an image may be received and composited at one or more devices. In one embodiment, the media content 302 can be stored or exist on a first device and can be sent to a second device via an interface, such as via a high definition multimedia interface (HDMI) connection. The second device can composite the received media content 302 with the onscreen display 304 to display a final composite image.

In another embodiment, the media content 302 and the onscreen display 304 can be stored or exist on the first device. The first device can composite the received media content 302 with the onscreen display 304 to display as a final composite image. The first device can then send the final composite image the second device via the interface. In another embodiment, the media content 302 and the onscreen display 304 may be stored or exist on a single device, where the single device can composite the media content 302 and onscreen display 304 and display the composite image.

The processing device compositing the media content 302 or the onscreen display 304 the can include changing an opacity or transparency of at least a segment of the media content 302 or the onscreen display 304. For example, compositing can include altering an opacity level of a segment of the onscreen display 304 (e.g., the dominant layer) so that a viewer can see part of the media content 302. For example, the processing device can define a window 306 in the onscreen display 304 that corresponds to a location on the bottom of the onscreen display 304. The window 306 can include information (such as text, graphics, or video) that can be superimposed on top of the media content 302. In one example, the information in window 306 can include closed caption text. The processing device can set the opacity level of the window 306 to be non-transparent or solid and can set the opacity level of the remaining portion 308 of the onscreen display 304 to be transparent. When the opacity level of the remaining portion 308 is transparent, the media content 302 can be visible to a viewer.

FIG. 3B illustrates a compositing of the media content 302 and the onscreen display 304 that includes a window 310 according to one embodiment. Some of the features in FIG. 3B are the same or similar to the some of the features in FIG. 3A as noted by same reference numbers, unless expressly described otherwise. The processing device can define the window 310 in the onscreen display 304 that corresponds to a location on the top of the onscreen display 304. The window 310 can include information (such as text, graphics, or video) that can be superimposed on top of the media content 302. In one example, the information in window 310 can include text for an emergency message. The remaining portion 308 of the onscreen display 304 can be transparent to permit at least of portion of the media content 302 to be visible through the remaining portion 308.

Figure 3C:
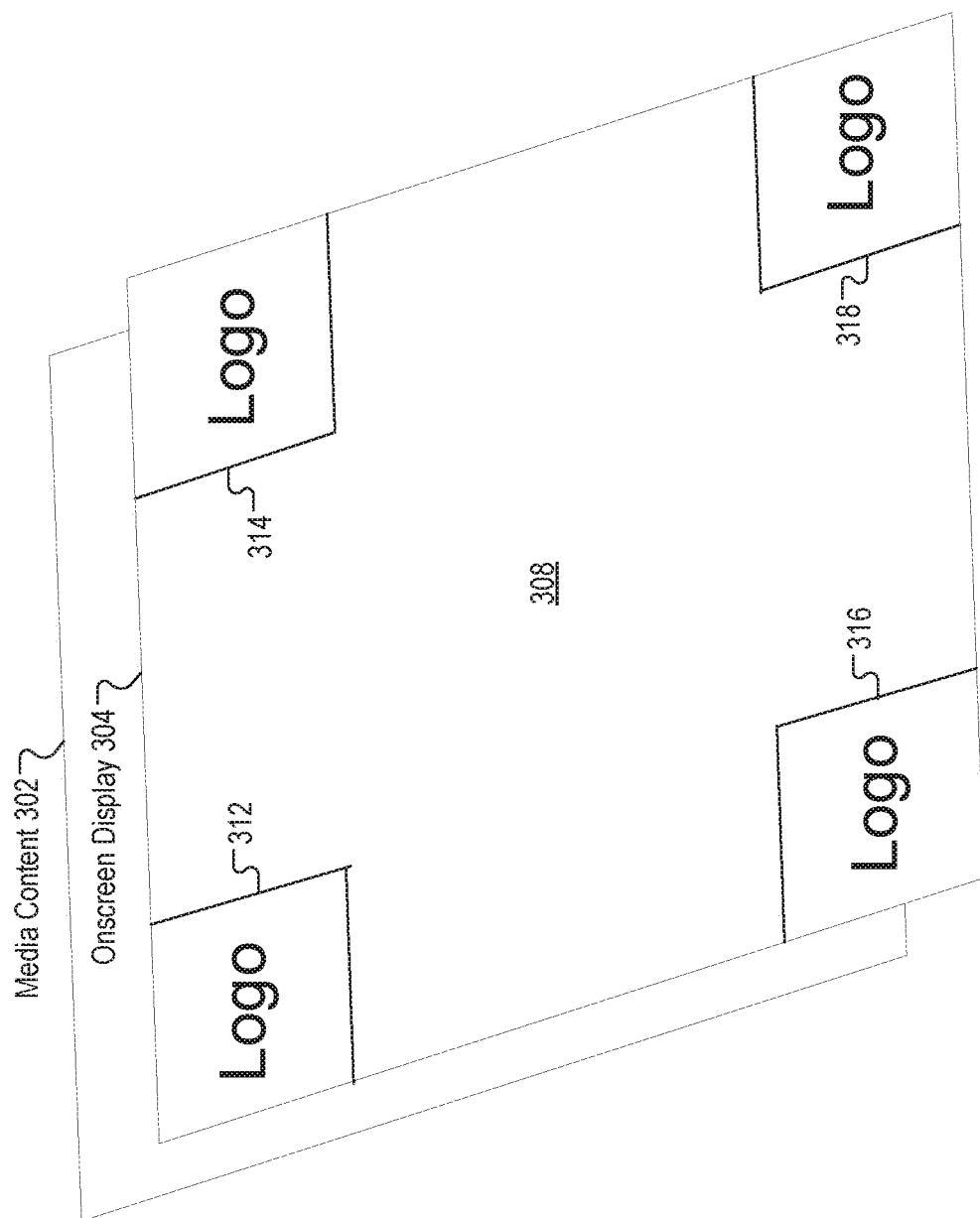
FIG. 3C illustrates a compositing of the media content and an onscreen display that includes windows according to one embodiment.

FIG. 3C illustrates a compositing of the media content 302 and an onscreen display 304 that includes windows 312-318 according to one embodiment. Some of the features in FIG. 3C are the same or similar to the some of the features in FIG. 3A as noted by same reference numbers, unless expressly described otherwise. The processing device can define the windows 312-318 in the onscreen display 304 to correspond to a location at the corners of the onscreen display 304. The windows 312-318 can include information (such as text, graphics, or video) that can be superimposed on one or more corners of the media content 302. In one example, the information in one or more of the windows 312-318 can include text and/or a graphic for a logo. The remaining portion 308 of the onscreen display 304 can be transparent to permit at least of portion of the media content 302 to be visible through the remaining portion 308.

Figure 3D:
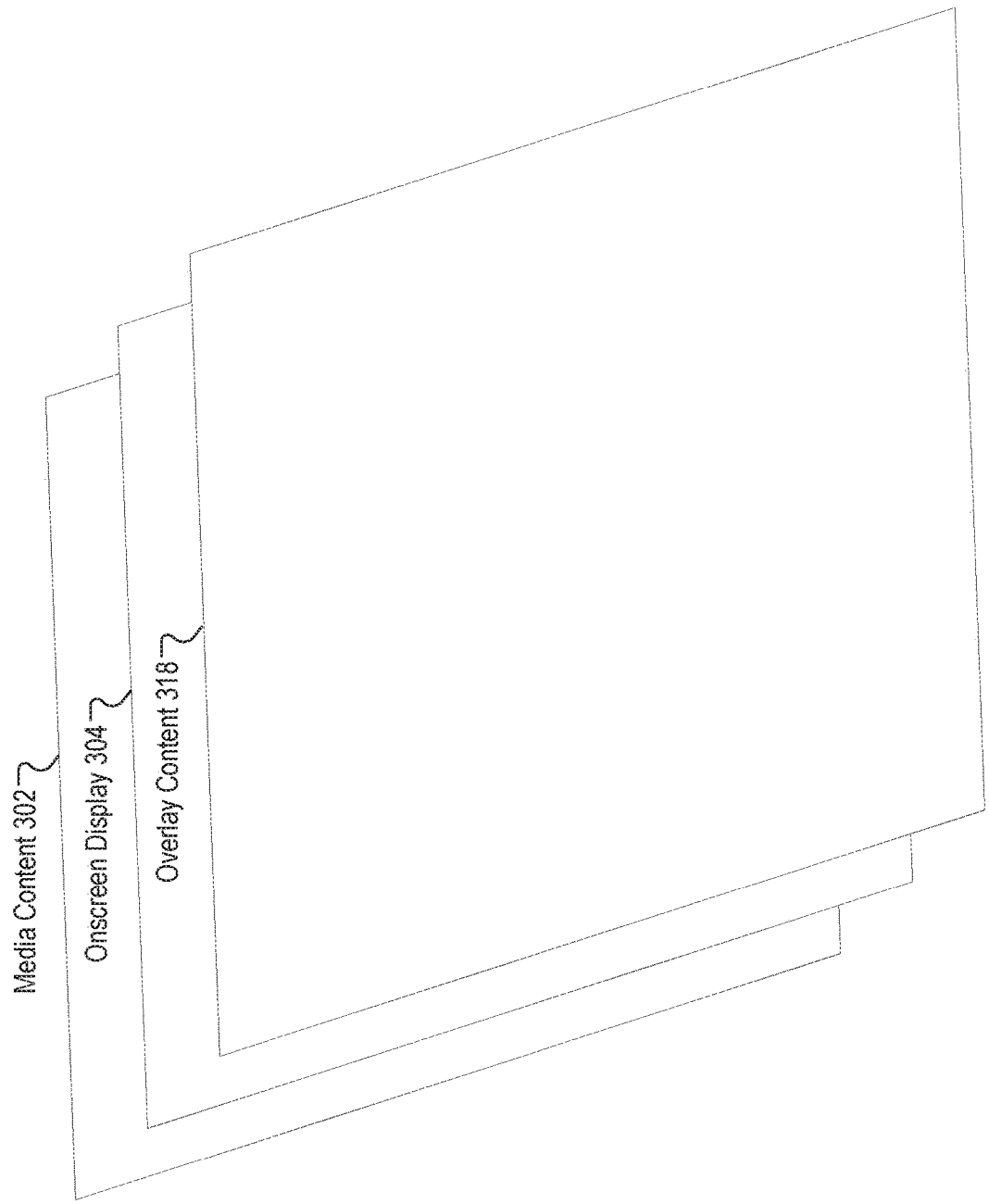
FIG. 3D illustrates a compositing of the media content, the onscreen display, and overlay content to create an image to display on an electronic device according to one embodiment.

FIG. 3D illustrates a compositing of the media content 302, the onscreen display 304, and overlay content 318 to create an image to display on an electronic device according to one embodiment. In one example, the top layer or the dominant layer can be the overlay content 318. In one example, the overlay content 318 can cover or mask the media content 302 (e.g., a lowest layer or bottom layer) and the onscreen display 304 (e.g., a middle layer). In this example, the onscreen display 304 can cover or mask the media content 302.

In one example, the processing device can adjust an opacity level of a portion of the overlay content 318 so that a viewer can see part of the onscreen display 304 that is under or behind the overlay content 318. In another example, the processing device can adjust an opacity level of a portion of the overlay content 318 and the onscreen display 304 so that a viewer can see parts of the overlay content 318, the onscreen display 304 and the media content 302.

Figure 4:
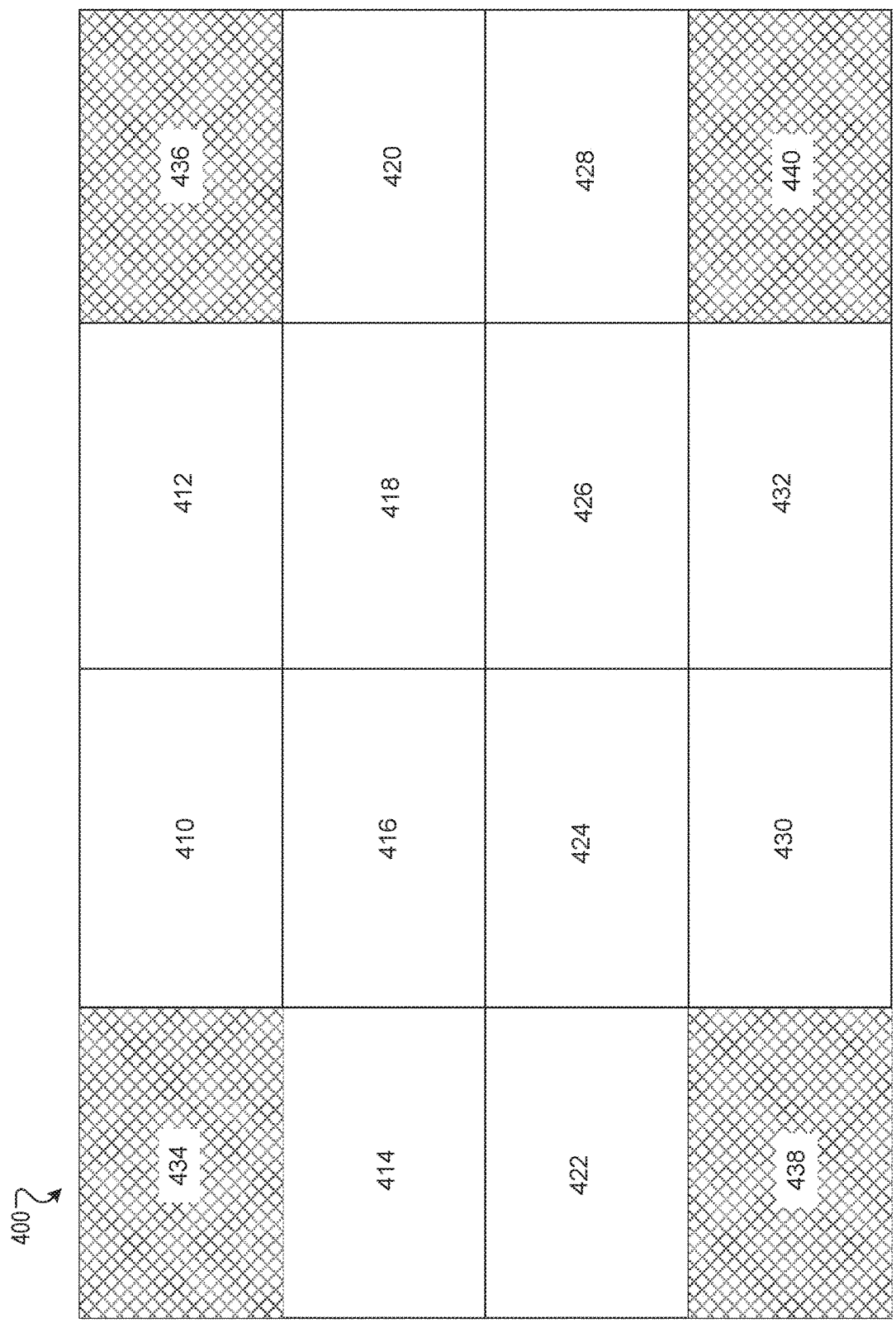
FIG. 4 illustrates a fully subdivided fingerprint layout of a frame according to one embodiment.

FIG. 4 illustrates a fully subdivided fingerprint layout of a frame 400 according to one embodiment. The frame 400 can be a composite of the media content 302 and the onscreen display 304 (FIGS. 3A-3D). The subdivided fingerprint layout can include an ACR system using the fully subdivided fingerprint layout to subdivide the frame 400 into multiple blocks 410-440. The blocks 410-440 can each represent different defined segments or locations in the frame 400. In one example, the blocks 410-440 can be rectangle shaped or square shaped. In another example, the blocks 410-440 can be polygon shaped, circle shaped, oval shaped, and so forth. In another example, each of the blocks 410-440 can be approximately the same size. In another example, one or more of the blocks 410-440 can be different sizes. A number of the blocks and the shapes and sizes of the blocks in a frame are not intended to be limiting and the number of blocks as well as the shapes and sizes of the blocks can vary.

In one embodiment, the frame 400 can be subdivided into a four by four grid with 16 blocks 410-440. The corner blocks 434, 436, 438, and/or 440 may include an onscreen display such as a logo. For example, the corners of the onscreen display 304 may be defined as available location to display a logo.

In one example, when the electronic device 118 (FIG. 1) receives a request from the ACR system 124 to generate a fingerprint for the frame 400 using the fully subdivided fingerprint layout, the electronic device 118 can generate a full fingerprint that includes the blocks 410-440. In this example, the electronic device 118 can then remove one or more of the corner blocks 434, 436, 438, and/or 440 from the fingerprint and send the fingerprint to the ACR system 124. In another example, when the electronic device 118 receives a request from the ACR system 124 to generate a fingerprint for the frame 400 using the fully subdivided fingerprint layout, the electronic device 118 can generate a fingerprint that excludes one or more of the corner blocks 434, 436, 438, and/or 440 from the fingerprint. The electronic device 118 can then send the fingerprint to the ACR system 124.

In one example, when the frame 400 is divided into a four by four grid of blocks with 16 blocks 410-440 and blocks 434, 436, 438, and 440 have been removed, there are a total of 12 blocks in the fully subdivided fingerprint layout. In this example, the fully subdivided fingerprint layout has a 12 block rank order with 12! different permutations (i.e., 12!=479001600 permutations). In one embodiment, an ACR system can store 7 days of media content for fingerprinting, assuming the media content has 30 frames per second. In one example, for 7 days of videos the total maximum number of frames is: 7 days*24 hours*60 minutes*60 seconds*30 frames=18144000 frames where 479001600 permutations/18144000 frames=26.4 times. In another example, for a three by three block, the fingerprint can have 9! different permutations. In another example, for a five by five block the fingerprint can have 25! different permutations.

The number of blocks in the subdivided fingerprint layout is not intended to be limiting. The number of blocks can range from 2 blocks to millions of blocks. In one example, the ACR system 124 or the electronic device 118 can select a number of blocks to use for the fully subdivided fingerprint layout to provide a sufficient number of permutations to avoid a threshold number of conflicts, where multiple fingerprints in the reference database 125 match the fingerprint for frame 400. In one embodiment, a three by three grid of blocks may have an insufficient number of permutations that may cause a number of conflicts that exceed the threshold number of conflicts.

In another embodiment, the ACR system 124 or the electronic device 118 can select a number of blocks to use for the fully subdivided fingerprint layout to avoid each block encompassing a small number of pixels. For example, the ACR system 124 or the electronic device 118 remove the corner blocks 434, 436, 438, and/or 440 from the fingerprint and blocks 410-432 can be reformatted to be grayscale blocks. In one example, the grayscale blocks can each have mean values.

The mean values of the grayscale blocks can increase or decrease based on a luminosity or lightness level of the grayscale blocks. For example, a white grayscale block can have a mean value of zero and a black grayscale block can have a mean value of 455. In this example, the mean values for grayscale blocks can use a smaller amount of data than color blocks. The mean values for grayscale blocks can also maintain a high amount of luminance information for fingerprinting. For example, the luminance information for grayscale blocks can be substantially similar to the luminance information for a color fingerprint of frame 400. A minor variation in a mean grayscale value for a block with a small block area (e.g., a small number of pixels) can change the fingerprint and cause a match with a fingerprint stored in the reference database to be incorrect.

The mean values associated with the blocks 410-432 can be ranked or weighted. For example, the blocks 410-432 can be ranked using an ordinal ranking. The ordinal ranking is a sequence of mean values where a rank of each of the mean values can be an ordinal rank of the respective grayscale mean value. For example, a sequence of values can be 10, 20, 40, 30 with an ordinal ranking of 1 2 4 3. In another example, a sequence of values can be 12 28 43 33 with an ordinal ranking also of 1 2 4 3.

In another example, the mean values of the associated blocks 410-432 can be ranked in an ascending or descending order. The rank of the 12 grayscale mean values associated with blocks 410-432 can be concatenated into a sequence, such as a hex string for example. The hex string can be a fingerprint value for the frame 400.

Figure 5A:
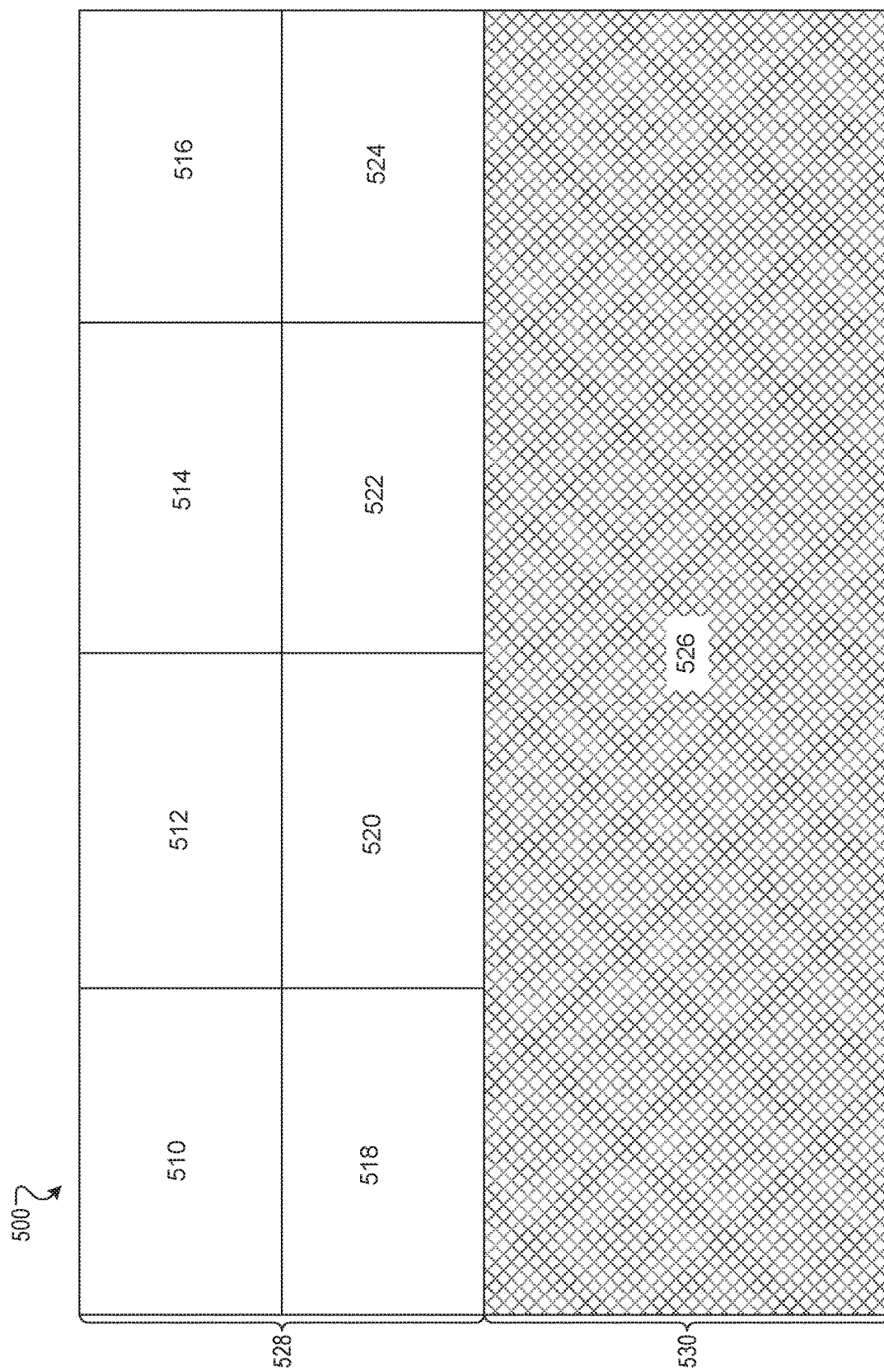
FIG. 5A illustrates a top subdivided fingerprint layout of a frame according to one embodiment.

FIG. 5A illustrates a top subdivided fingerprint layout of a frame 500 according to one embodiment. The top subdivided fingerprint layout can include the frame 500 subdivided into multiple blocks 510-526. The top subdivided fingerprint layout can include a top segment 528 with blocks 510-524 and a bottom segment 530 with block 526.

For example, the top segment 528 of the frame 500 can be subdivided into a two by four grid with 8 segments 510-524. The block 526 may be more likely to include an onscreen display such as a logo, emergency message, or closed captions. In one example, when the electronic device 118 receives a request from the ACR system 124 to generate a fingerprint of the frame 500 using the top subdivided fingerprint layout, the electronic device 118 can remove or exclude block 526 from the fingerprint.

In one example, the multiple blocks 510-526 can be a rectangle shape or a square shape. In another example, the blocks 510-526 can be a polygon shape, a circle shape, an oval shape, and so forth. In another example, each of the multiple blocks 510-524 and 526 can be approximately the same size. In another example, one or more of the multiple blocks 510-524 and 526 can be different sizes. A number of the multiple blocks 510-524 and 526 and the shapes and sizes of the multiple blocks 510-524 and 526 are not intended to be limiting and can vary.

Figure 5B:
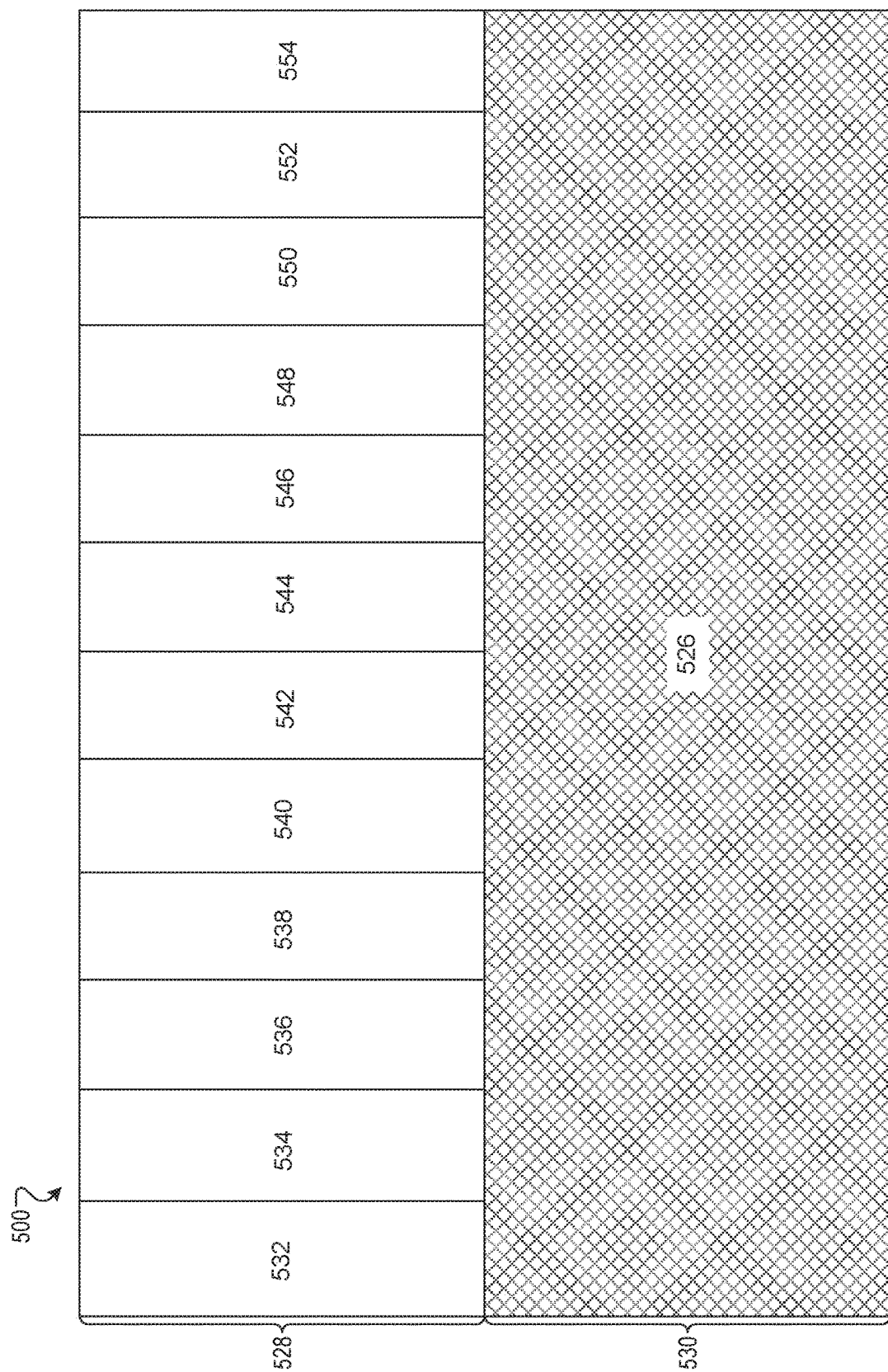
FIG. 5B illustrates the top subdivided fingerprint layout of the frame as shown in FIG. 5A with multiple blocks according to one embodiment.

FIG. 5B illustrates the top subdivided fingerprint layout of the frame 500 as shown in FIG. 5A with blocks 532-554 according to one embodiment. Some of the features in FIG. 5B are the same or similar to the some of the features in FIG. 5A as noted by same reference numbers, unless expressly described otherwise. The blocks 532-554 can be divided vertically as compared to the grid division of blocks 510-524 in FIG. 5A. The top subdivided fingerprint layout in FIG. 5B is substantially the same as FIG. 5A in all other regards.

FIG. 5C illustrates a bottom subdivided fingerprint layout for the frame 500 as shown in FIG. 5A with blocks 510-524 according to one embodiment. Some of the features in FIG. 5C are the same or similar to the some of the features in FIG. 5A as noted by same reference numbers, unless expressly described otherwise. For the bottom subdivided fingerprint layout The blocks 510-524 can be located on the bottom segment 530 as compared to the blocks 510-524 being located on the top segment 528 in FIG. 5A. The bottom subdivided fingerprint layout in FIG. 5C is substantially the same as FIG. 5A in all other regards.

Figure 5D:
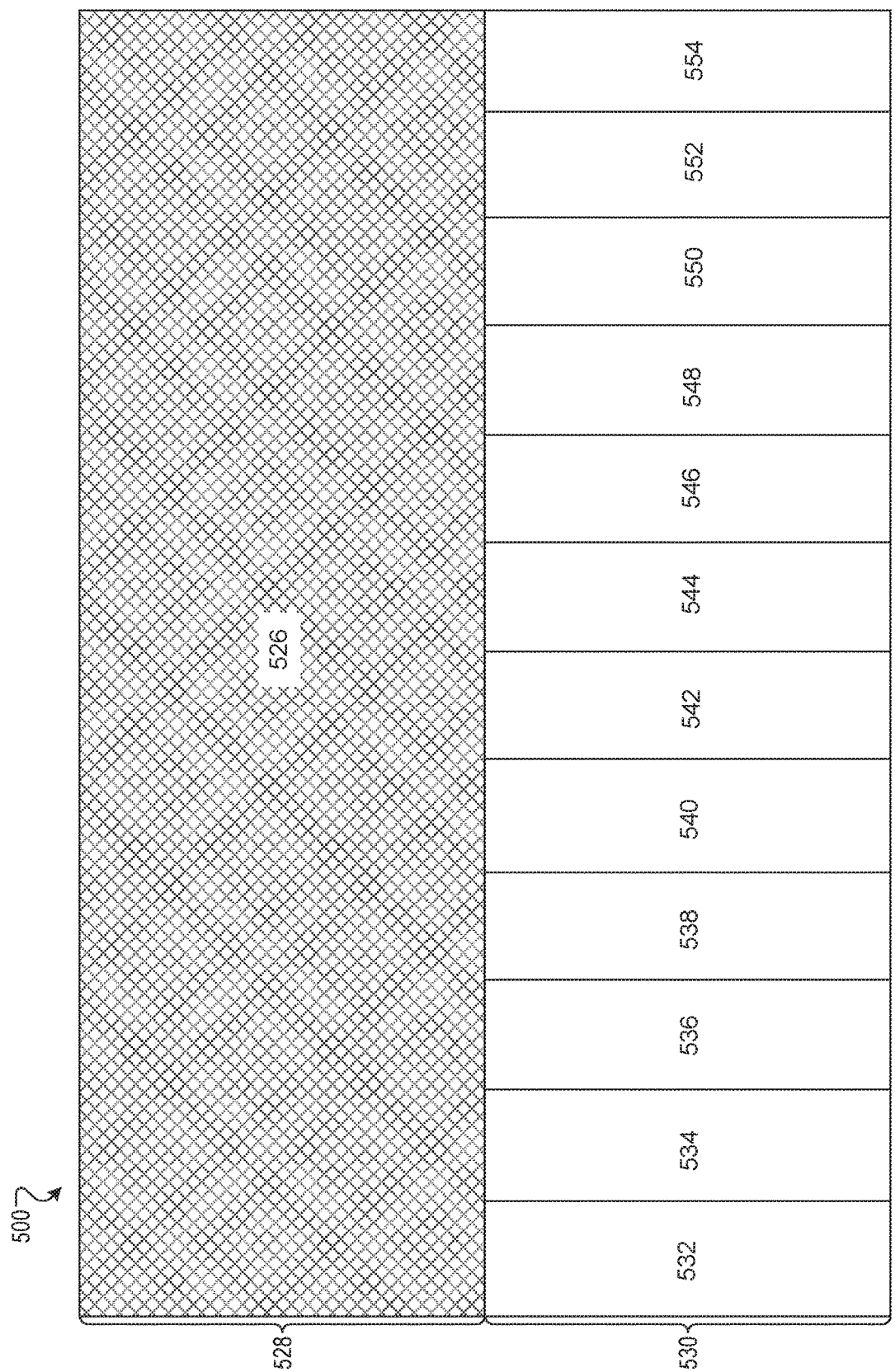
FIG. 5D illustrates the bottom subdivided fingerprint layout of the frame as shown in FIG. 5C with multiple blocks according to one embodiment.

FIG. 5D illustrates the bottom subdivided fingerprint layout for the frame 500 as shown in FIG. 5C with blocks 532-554 according to one embodiment. Some of the features in FIG. 5D are the same or similar to the some of the features in FIG. 5C as noted by same reference numbers, unless expressly described otherwise. The blocks 532-554 can be divided vertically as compared to the grid division of blocks 510-524 in FIG. 5C. The blocks 532-554 can be located on the bottom segment 530 as compared to the blocks 510-524 being located on the top segment 528 in FIG. 5B. The bottom subdivided fingerprint layout in FIG. 5D is substantially the same as FIG. 5C in all other regards.

Figure 6A:
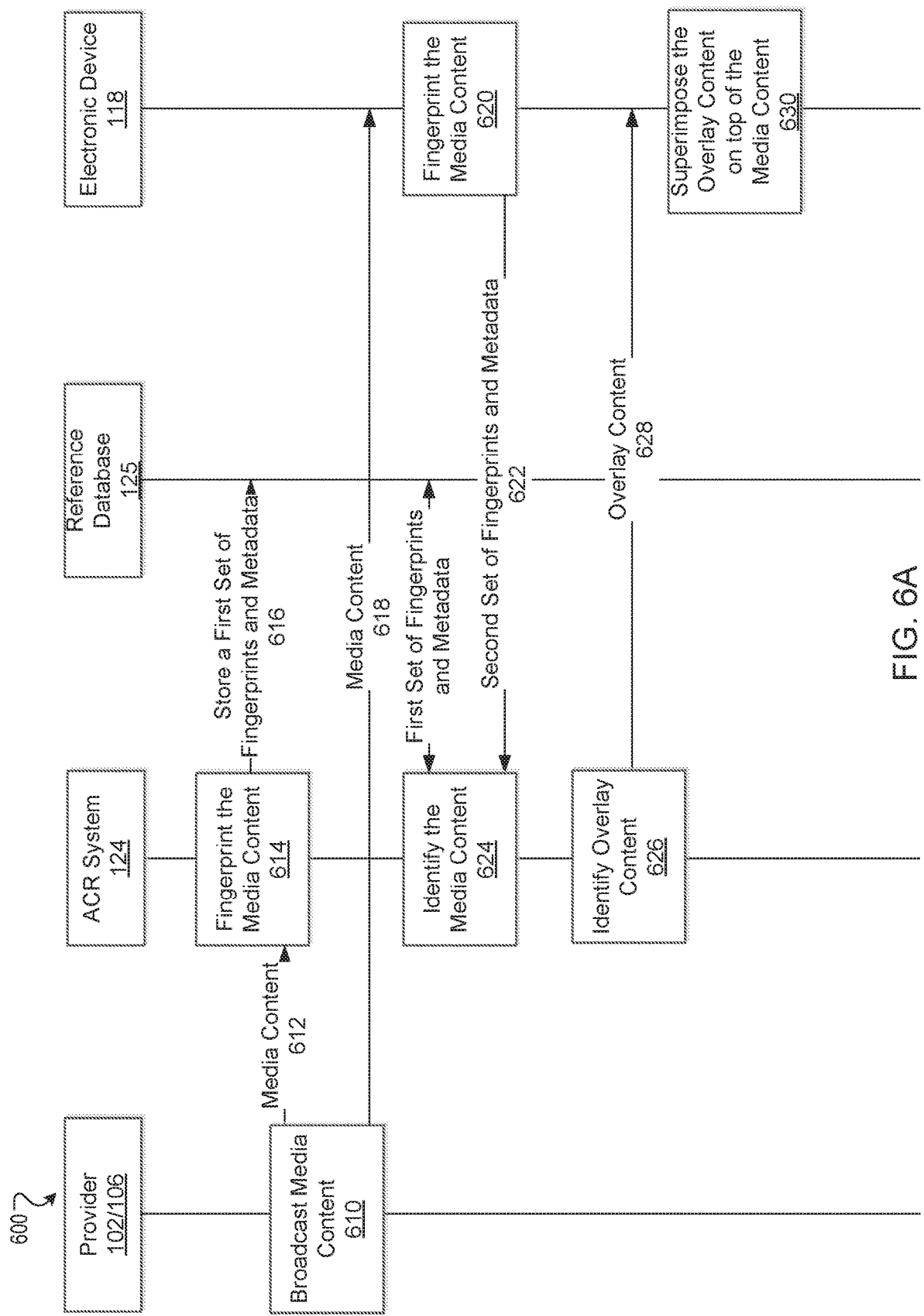
FIG. 6A illustrates a flowchart a method for identifying media content according to one embodiment.

FIG. 6 illustrates a flowchart of a method 600 for identifying media content according to one embodiment. The method 600 may at least partially be performed by processing logic that includes hardware (e.g., circuitry, dedicated logic, programmable logic, microcode, etc.), software (e.g., instructions executed by a processing device), firmware or a combination thereof. The method 600 may be performed by all or part of the content distribution network 100 of FIG. 1. For example, the method 600 may be performed by all or part of the processing logic of the electronic device 118 or 120, the ACR system 124 or 126, or the reference database 125 or 127 (FIG. 1). Some of the features in FIG. 6A are the same or similar to the some of the features in FIG. 1 as noted by same reference numbers, unless expressly described otherwise.

Referring to FIG. 6A, the method 600 begins with broadcasting, by the content provider 102 or a local provider 106, media content to the ACR system 124 and the electronic device 118 (block 610). The method can include the ACR system 124 can receive the media content (block 612). The method can include the ACR system 124 fingerprinting the media content to obtain a first set of fingerprints (block 614). The ACR system 124 can generate a first fingerprint using the fully subdivided fingerprint layout, a second fingerprint using the top subdivided fingerprint layout, and a third fingerprint using the top subdivided fingerprint layout. The first set of fingerprints can include the first fingerprint, the second fingerprint, and the third fingerprint.

The method can include the ACR system 124 storing the first set of fingerprints and metadata associated with the media content at the reference database 125 (block 616). The method can include the electronic device 118 receiving the media content (block 618). The method can include the electronic device 118 fingerprinting the media content to obtain a second set of fingerprints (block 620). The electronic device 118 can generate the fourth fingerprint using the fully subdivided fingerprint layout, a fifth fingerprint using the top subdivided fingerprint layout, and a sixth fingerprint using the top subdivided fingerprint layout. The second set of fingerprints can include the fourth fingerprint, the fifth fingerprint, and the sixth fingerprint.

The method can include the electronic device 118 sending the second set of fingerprints and metadata associated with the media content to the ACR system 124 (block 622). The metadata can include schedule data associated with the first set of fingerprints, the second set of fingerprints, or the media content. The schedule data can include a schedule of air times of media content or commercials. In another example, the schedule data can include data obtained from a third-party server or database. In another example, the schedule data can include data obtained directly from a broadcast system via internal scheduling systems of the broadcast system. In another embodiment, the metadata can include events that occur at the electronic device 118, such as the electronic device 118 receiving a command from an input device: to pause the media content; fast forward the media content, rewind the media content, and so forth.

The method can include the ACR system 124 identifying the media content displayed on the electronic device 118 using the subdivided fingerprint layout, the top subdivided fingerprint layout, the bottom subdivided fingerprint layout, or a combination thereof as described in the preceding paragraphs (block 624). In one embodiment, the ACR system 124 can use the top subdivided fingerprint layout to compare the blocks 510-524 in the second fingerprint with all of the top subdivided fingerprint layout fingerprints in the reference database 125. When the blocks 510-524 in the fifth fingerprint match the corresponding blocks 510-524 in the second fingerprint, the ACR system 124 can identify the media content associated with the second fingerprint. In another embodiment, the ACR system 124 can similarly the use the subdivided fingerprint layout to compare the blocks 410-432 in the first fingerprint with all of the subdivided fingerprint layout fingerprints in the reference database 125. When the blocks 410-432 in the fourth fingerprint match the corresponding blocks 510-524 in the first fingerprint, the ACR system 124 can identify the media content associated with the first fingerprint. In another embodiment, the ACR system 124 can similarly the use the bottom subdivided fingerprint layout to compare the blocks 510-524 in the third fingerprint with all of the bottom subdivided fingerprint layout fingerprints in the reference database 125. When the blocks 510-524 in the sixth fingerprint match the corresponding blocks 510-524 in the third fingerprint, the ACR system 124 can identify the media content associated with the third fingerprint.

In one embodiment, the ACR system 124 can sequentially query each type of fingerprint layouts in reference database 125 when searching for a fingerprint match. For example, the ACR system 124 can perform a first query of all of the fingerprints in the reference database 125 with the subdivided fingerprint layout to determine if any of the subdivided fingerprint layout fingerprints match the fourth fingerprint. When the ACR system 124 identifies a fingerprint match, then the ACR system 124 can stop the query and identify the media content associated with the matching fingerprints. When the ACR system 124 does not identify a fingerprint match, then the ACR system 124 can perform a second query of all of the fingerprints in the reference database 125 with the top subdivided fingerprint layout to determine if any of the top subdivided fingerprint layout fingerprints match the fifth fingerprint. When the ACR system 124 identifies a fingerprint match, then the ACR system 124 can stop the query and identify the media content associated with the matching fingerprints. When the ACR system 124 does not identify a fingerprint match, then the ACR system 124 can perform a third query of all of the fingerprints in the reference database 125 with the bottom subdivided fingerprint layout to determine if any of the bottom subdivided fingerprint layout fingerprints match the sixth fingerprint. When the ACR system 124 identifies a fingerprint match, then the ACR system 124 can stop the query and identify the media content associated with the matching fingerprints. The fingerprint layouts used in the first query, the second query, and the third query are not intended to be limiting and the fingerprint layouts can be used in any order.

In another embodiment, the ACR system 124 can perform parallel queries of each type of fingerprint layout in reference database 125 when searching for a fingerprint match. For example, the ACR system 124 can perform the first query, the second query, and the third query at the same time. When the ACR system 124 identifies a fingerprint match for the first query, the second query, or the third query, the ACR system can stop the query and identify the media content associated with the matching fingerprints.

The method can include the ACR system 124 identifying overlay content to superimpose onto the media content (block 626). In one example, the overlay content can be stored in the reference database 125 or at a memory device coupled to the ACR system 124. The overlay content can correlate to the identified media content. The method can include sending the overlay content to the electronic device 118 (block 628). The method can include the electronic device 118 superimposing the overlay content on top of at least a segment of the media content (630).

The use of the ACR system 124, the reference database 125, and the electronic device 118 in FIG. 6A are not intended to be limiting and other components (such as the components shown in FIG. 1) can implement one or more steps shown in FIG. 6. For example, the ACR system 124 can be substituted with ACR system 126, the electronic device 118 can be substituted with electronic device 120 and the reference database 125 can be substituted with reference database 127.

Figure 6B:
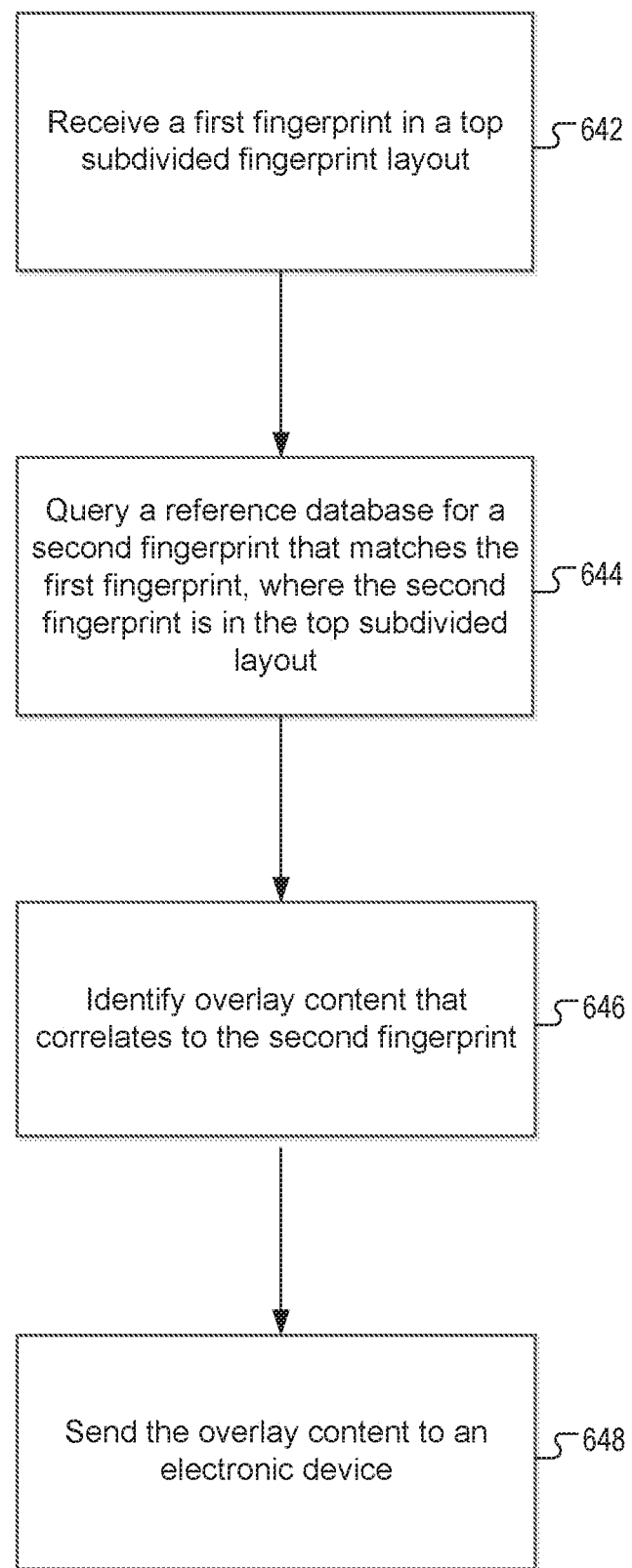
FIG. 6B illustrates a flowchart of a method for identifying media content using a top subdivided fingerprint layout according to one embodiment FIG. 7 schematically illustrates a block diagram of a system according to one embodiment.

FIG. 6B illustrates a flowchart of a method 640 for identifying media content using a top subdivided fingerprint layout according to one embodiment. The method 640 may at least partially be performed by processing logic that includes hardware (e.g., circuitry, dedicated logic, programmable logic, microcode, etc.), software (e.g., instructions executed by a processing device), firmware or a combination thereof. The method 640 may be performed by all or part of the content distribution network 100 of FIG. 1. For example, the method 640 may be performed by all or part of the processing logic of the electronic device 118 or 120, the ACR system 124 or 126, or the reference database 125 or 127 (FIG. 1). Some of the features in FIG. 6B are the same or similar to the some of the features in FIG. 1 as noted by same reference numbers, unless expressly described otherwise.

Referring to FIG. 6B, the method 640 begins with the ACR system 124 receiving a first fingerprint in a top subdivided fingerprint layout (block 642). The method can include the ACR system 124 querying the reference database 125 for a second fingerprint that matches the first fingerprint, where the second fingerprint is in the top subdivided layout (block 644). The method can also include the ACR system 124 identifying overlay content that correlates to the second fingerprint (block 646). For example, the reference database 125 can store multiple fingerprints. The fingerprints can correlate to different overlay content. The overlay content can be stored in the reference database 125 or another memory device. The method can include the ACR system 124 sending the overlay content to the electronic device 118 (block 648). The format of the first fingerprint and the second fingerprint is not intended to be limiting. The format of the first fingerprint and the second fingerprint can be the fully subdivided fingerprint layout, the top subdivided fingerprint layout, the bottom subdivided fingerprint layout, or other fingerprint layouts.

Figure 7:
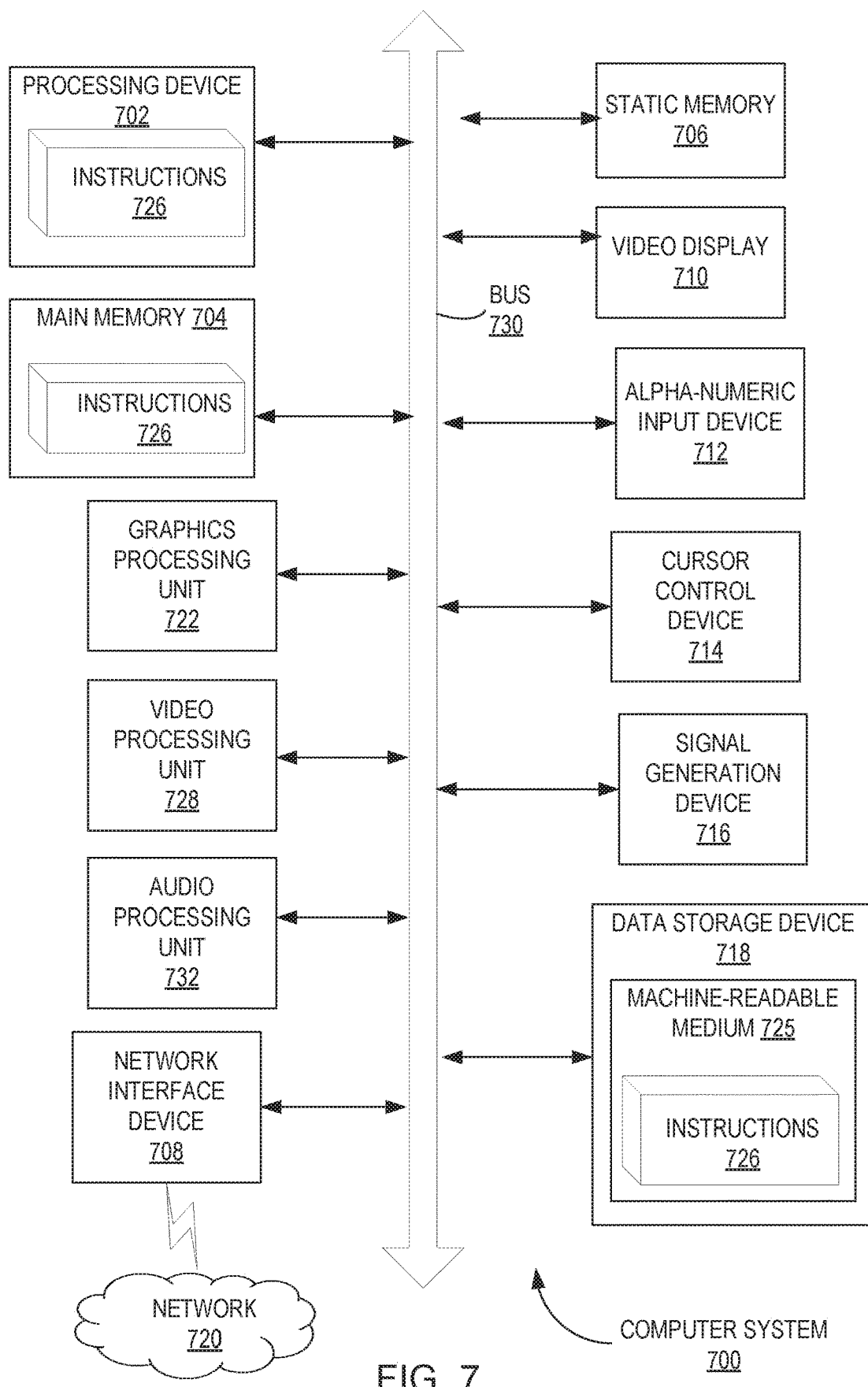

FIG. 7 illustrates a diagrammatic representation of a machine in the example form of a computer system 700 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or an electronic device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a smartphone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 700 may correspond to the ACR fingerprinter server 105 of FIG. 1. The computer system 700 may correspond to at least a segment of a cloud-based computer system. The computer system 700 includes a processing device 702, a main memory 704 (e.g., read-only memory (ROM), flash memory, dynamic random access memory (DRAM) (such as synchronous DRAM (SDRAM) or DRAM (RDRAM), etc.), a static memory 706 (e.g., flash memory, static random access memory (SRAM), etc.), and a data storage device 718, which communicate with each other via a bus 730.

Processing device 702 represents one or more processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. In one embodiment, processing device 702 may include one or more processing cores. The processing device 702 is configured to execute the instructions 726 of a mirroring logic stored in the main memory 704 for performing the operations discussed herein.

The computer system 700 may further include a network interface device 708 communicably coupled to a network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a signal generation device 716 (e.g., a speaker), or other peripheral devices. Furthermore, computer system 700 may include a graphics processing unit 722, a video processing unit 728, and an audio processing unit 732. In another embodiment, the computer system 700 may include a chipset (not illustrated), which refers to a group of integrated circuits, or chips, that are designed to work with the processing device 702 and controls communications between the processing device 702 and external devices. For example, the chipset may be a set of chips on a motherboard that links the processing device 702 to very high-speed devices, such as main memory 704 and graphic controllers, as well as linking the processing device 702 to lower-speed peripheral buses of peripherals, such as USB, PCI or ISA buses.

The data storage device 718 may include a computer-readable storage medium 725 on which is stored instructions 726 embodying any one or more of the methodologies of functions described herein. The instructions 726 may also reside, completely or at least partially, within the main memory 704 and/or within the processing device 702 during execution thereof by the computer system 700; the main memory 704 and the processing device 702 also constituting computer-readable storage media.

The computer-readable storage medium 725 may also be used to store instructions 726 utilizing logic and/or a software library containing methods that call the above applications. While the computer-readable storage medium 725 is shown in an example embodiment to be a single medium, the term "computer-readable storage medium" or "computer-readable medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Although the embodiments may be herein described with reference to specific integrated circuits, such as in computing platforms or microprocessors, other embodiments are applicable to other types of integrated circuits and logic devices. Similar techniques and teachings of embodiments described herein may be applied to other types of circuits or semiconductor devices. For example, the disclosed embodiments are not limited to desktop computer systems or Ultrabooks™ and may be also used in other devices, such as handheld devices, tablets, other thin notebooks, systems on a chip (SOC) devices, and embedded applications. Some examples of handheld devices include cellular phones, Internet protocol devices, smartphones, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that may perform the functions and operations taught below.

Although the embodiments are herein described with reference to a processor or processing device, other embodiments are applicable to other types of integrated circuits and logic devices. Similar techniques and teachings of embodiments of the present invention may be applied to other types of circuits or semiconductor devices that may benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, and/or 16 bit data operations and may be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

Some segments of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein may be hardware, software, firmware, or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "detecting," "initiating," "determining," "continuing," "halting," "receiving," "recording," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or electronic devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

Embodiments described herein may also relate to an apparatus for performing the operations herein. This apparatus may be specially constructed for the required purposes, or it may comprise a computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various computing systems may be used with programs in accordance with the teachings herein, or it may prove convenient to construct a more specialized apparatus to perform the operations. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments. It will be apparent to one skilled in the art, however, that at least some embodiments may be practiced without these specific details. In other instances, well-known components or methods are not described in detail or are presented in simple block diagram format in order to avoid unnecessarily obscuring the present embodiments. Thus, the specific details set forth above are merely exemplary. Particular implementations may vary from these exemplary details and still be contemplated to be within the scope of the present embodiments.

It is to be understood that the above description is intended to be illustrative and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

The invention claimed is:

1. A computing system comprising:
   one or more processors; and
   a computer readable medium storing instructions that, when executed by the one or more processors, cause the computing system to perform functions comprising:
      accessing a first video frame of a video stream, the first video frame comprising first pixel values that correspond respectively to first positions within the first video frame;
      selecting second pixel values that correspond respectively to second positions within the first video frame based on a first fingerprint layout that identifies the second positions, wherein the first pixel values include the second pixel values and at least one pixel value that is not included in the second pixel values, and wherein the first positions include the second positions and at least one position that (a) is not included in the second positions and (b) corresponds to the at least one pixel value;
      generating a first fingerprint file that identifies the first video frame by processing the second pixel values;
      determining that the first fingerprint file does not match any fingerprint file stored at a database;
      in response to determining that the first fingerprint file does not match any fingerprint file stored at the database, selecting third pixel values that correspond respectively to third positions within the first video frame based on a second fingerprint layout that identifies the third positions, wherein the first pixel values include the third pixel values and at least one additional pixel value that is not included in the third pixel values, and wherein the first positions include the third positions and at least one position that (a) is not included in the third positions and (b) corresponds to the at least one additional pixel value;

generating a second fingerprint file that identifies the first video frame by processing the third pixel values;

determining that the second fingerprint file matches a third fingerprint file stored at the database; and in response to determining that the second fingerprint file matches the third fingerprint file, identifying one or more third video frames and replacing one or more second video frames of the video stream with the one or more third video frames.

2. The computing system of claim 1, wherein accessing the first video frame comprises receiving the first video frame from a media device.

3. The computing system of claim 1, wherein the second pixel values comprise luminance values, and wherein generating the first fingerprint file by processing the second pixel values comprises generating the first fingerprint file by processing the luminance values.

4. The computing system of claim 3, wherein processing the luminance values comprises:

making a determination of whether a first luminance value of the luminance values is greater than or less than a second luminance value of the luminance values; and generating the first fingerprint file based on the determination.

5. The computing system of claim 3, wherein processing the luminance values comprises:

calculating a first mean luminance value for a first group of the luminance values and a second mean luminance value for a second group of the luminance values;

making a determination of whether the first mean luminance value is greater than or less than the second mean luminance value; and generating the first fingerprint file based on the determination.

6. The computing system of claim 5, wherein the first fingerprint file comprises a sequence of numbers indicating whether the first mean luminance value is greater than or less than the second mean luminance value.

7. The computing system of claim 1, wherein the first video frame is a rectangular video frame comprising four corner regions, and wherein the at least one position that is not included in the second positions comprises one or more of the four corner regions.

8. The computing system of claim 1, wherein the first video frame is a rectangular video frame comprising (i) an upper region spanning from a left edge of the rectangular video frame to a right edge of the rectangular video frame and (ii) a lower region spanning from the left edge to the right edge, and wherein the at least one position that is not included in the second positions comprises the lower region.

9. The computing system of claim 8, wherein the second pixel values correspond respectively to a first row of portions of the upper region and to a second row of portions of the upper region that are between the lower region and the first row.

10. The computing system of claim 8, wherein the second pixel values correspond respectively to a row of portions of the upper region that span from an upper edge of the rectangular video frame to the lower region.

11. The computing system of claim 1, wherein the first video frame is a rectangular video frame comprising (i) an upper region spanning from a left edge of the rectangular video frame to a right edge of the rectangular video frame and (ii) a lower region spanning from the left edge to the right edge, and wherein the at least one position that is not included in the second positions comprises the upper region.

12. The computing system of claim 11, wherein the second pixel values correspond respectively to a first row of portions of the lower region and to a second row of portions of the lower region that is between the upper region and the first row.

13. The computing system of claim 11, wherein the second pixel values correspond respectively to a row of portions of the lower region that span from a lower edge of the rectangular video frame to the upper region.

14. A method comprising:

accessing a first video frame of a video stream, the first video frame comprising first pixel values that correspond respectively to first positions within the first video frame;

selecting second pixel values that correspond respectively to second positions within the first video frame based on a first fingerprint layout that identifies the second positions, wherein the first pixel values include the second pixel values and at least one pixel value that is not included in the second pixel values, and wherein the first positions include the second positions and at least one position that (a) is not included in the second positions and (b) corresponds to the at least one pixel value;

generating a first fingerprint file that identifies the first video frame by processing the second pixel values;

determining that the first fingerprint file does not match any fingerprint file stored at a database;

in response to determining that the first fingerprint file does not match any fingerprint file stored at the database, selecting third pixel values that correspond respectively to third positions within the first video frame based on a second fingerprint layout that identifies the third positions, wherein the first pixel values include the third pixel values and at least one additional pixel value that is not included in the third pixel values, and wherein the first positions include the third positions and at least one position that (a) is not included in the third positions and (b) corresponds to the at least one additional pixel value;

generating a second fingerprint file that identifies the first video frame by processing the third pixel values;

determining that the second fingerprint file matches a third fingerprint file stored at the database; and in response to determining that the second fingerprint file matches the third fingerprint file, identifying one or more third video frames and replacing one or more second video frames of the video stream with the one or more third video frames.

15. The method of claim 14, wherein the second pixel values comprise luminance values, and wherein generating the first fingerprint file by processing the second pixel values comprises generating the first fingerprint file by processing the luminance values.

16. The method of claim 15, wherein processing the luminance values comprises:

making a determination of whether a first luminance value of the luminance values is greater than or less than a second luminance value of the luminance values; and generating the first fingerprint file based on the determination.

17. A non-transitory computer readable medium storing instructions that, when executed by a computing system, cause the computing system to perform functions comprising:

accessing a first video frame of a video stream, the first video frame comprising first pixel values that correspond respectively to first positions within the first video frame;

selecting second pixel values that correspond respectively to second positions within the first video frame based on a first fingerprint layout that identifies the second positions, wherein the first pixel values include the second pixel values and at least one pixel value that is not included in the second pixel values, and wherein the first positions include the second positions and at least one position that (a) is not included in the second positions and (b) corresponds to the at least one pixel value;

generating a first fingerprint file that identifies the first video frame by processing the second pixel values;

determining that the first fingerprint file does not match any fingerprint file stored at a database;

in response to determining that the first fingerprint file does not match any fingerprint file stored at the database, selecting third pixel values that correspond respectively to third positions within the first video frame based on a second fingerprint layout that identifies the third positions, wherein the first pixel values include the third pixel values and at least one additional pixel value that is not included in the third pixel values, and wherein the first positions include the third positions and at least one position that (a) is not included in the third positions and (b) corresponds to the at least one additional pixel value;

generating a second fingerprint file that identifies the first video frame by processing the third pixel values;

determining that the second fingerprint file matches a third fingerprint file stored at the database; and in response to determining that the second fingerprint file matches the third fingerprint file, identifying one or more third video frames and replacing one or more second video frames of the video stream with the one or more third video frames.

18. The non-transitory computer readable medium of claim 17, wherein accessing the first video frame comprises receiving the first video frame from a media device.

19. The non-transitory computer readable medium of claim 17, wherein the second pixel values comprise luminance values, and wherein generating the first fingerprint file by processing the second pixel values comprises generating the first fingerprint file by processing the luminance values.

20. The non-transitory computer readable medium of claim 19, wherein processing the luminance values comprises:

making a determination of whether a first luminance value of the luminance values is greater than or less than a second luminance value of the luminance values; and generating the first fingerprint file based on the determination.

* * * * *